Figure 6:
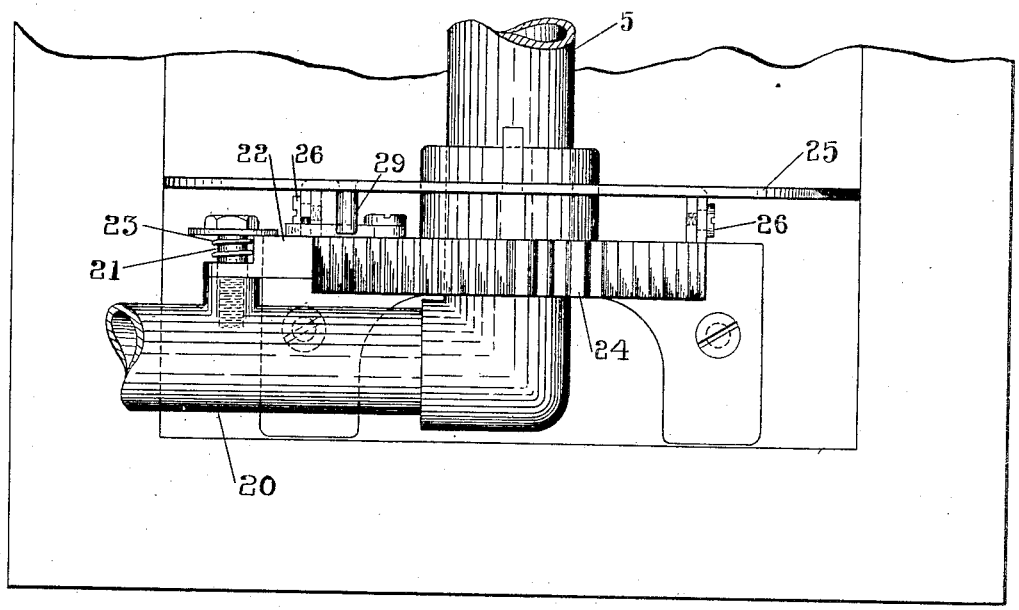

No. 865,052. PATENTED SEPT. 3, 1907.
R. McKENZIE.
VOTING MACHINE.
APPLICATION FILED MAR. 2, 1901.
23 SHEETS—SHEET 1.
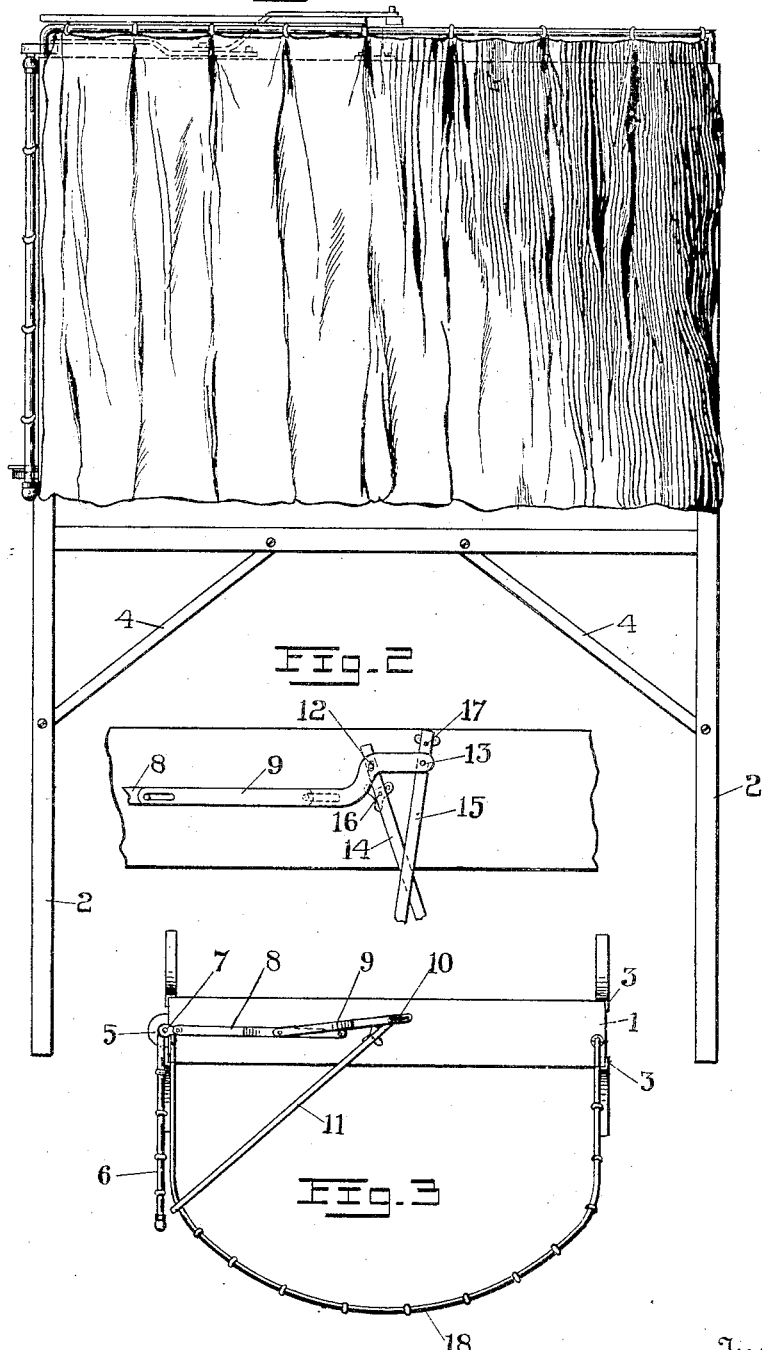

No. 865,052. PATENTED SEPT. 3, 1907
R. McKENZIE.,
VOTING MACHINE.
APPLICATION FILED MAR. 2, 1901.
23 SHEETS—SHEET 2.
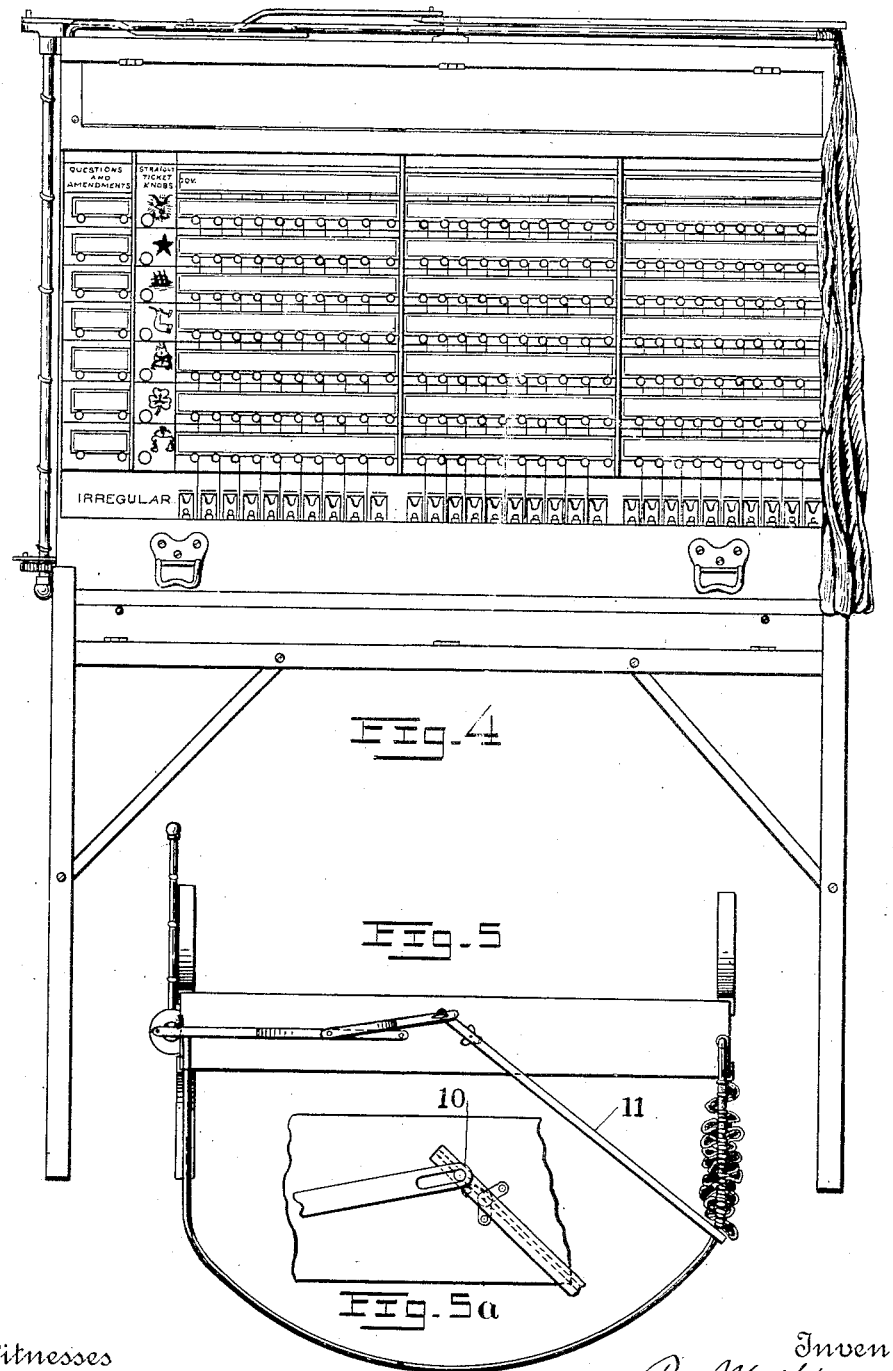

No. 865,052. PATENTED SEPT. 3, 1907.
R. McKENZIE.
VOTING MACHINE.
APPLICATION FILED MAR. 2, 1901.
23 SHEETS—SHEET 3.

Witnesses
Stephen Kinsta
Fred Englert

Inventor
R. McKenzie
by Wilkinson & Fisher.
Attorneys.

No. 865,052. PATENTED SEPT. 3, 1907.
R. McKENZIE.
VOTING MACHINE.
APPLICATION FILED MAR. 2, 1901.
23 SHEETS—SHEET 5.
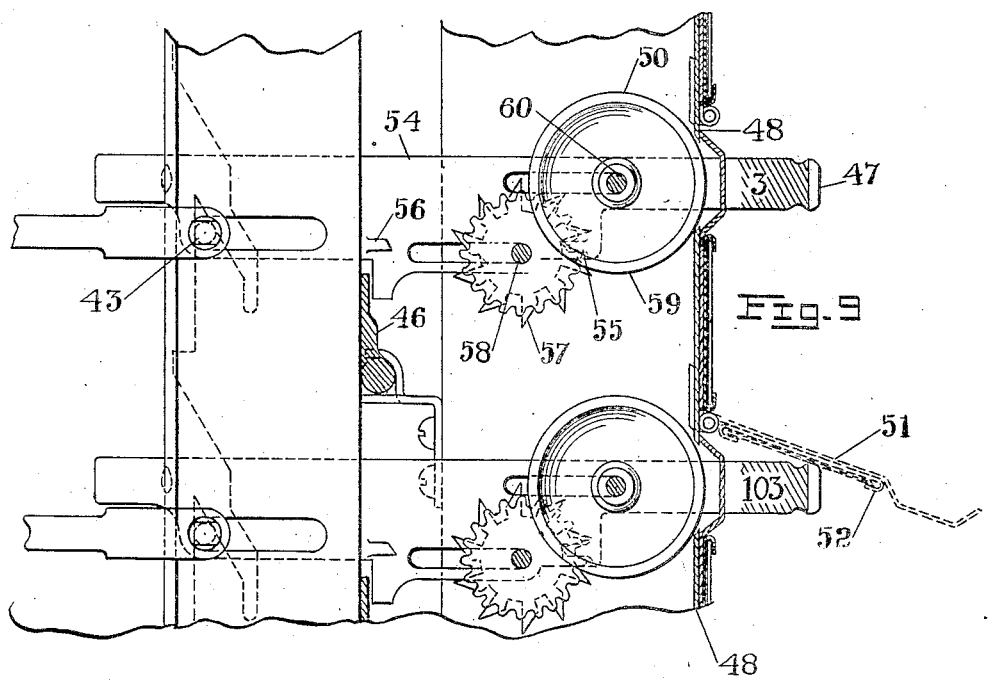
Fig. 9
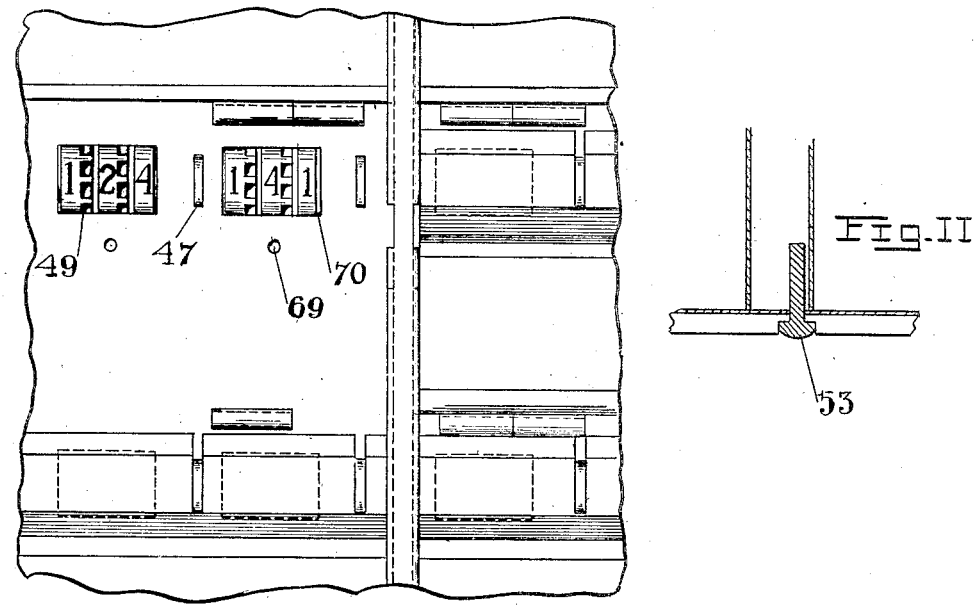
Fig. 10
Fig. 11
Witnesses
Stephen Giusta
Fred Englert
Inventor
R. McKenzie
by Wilkinson & Fisher
Attorneys No. 865,052. PATENTED SEPT. 3, 1907.
R. McKENZIE.
VOTING MACHINE.
APPLICATION FILED MAR. 2, 1901.
23 SHEETS—SHEET 6.
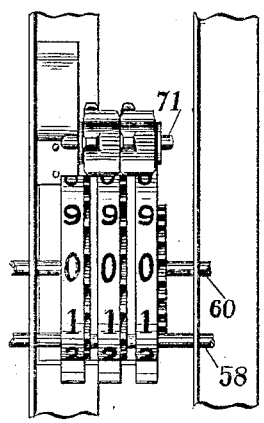
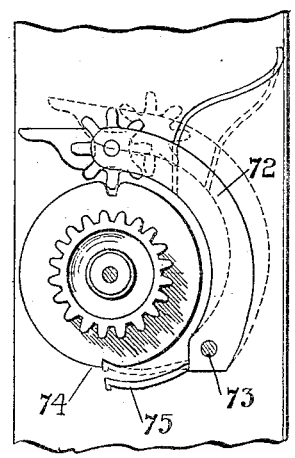
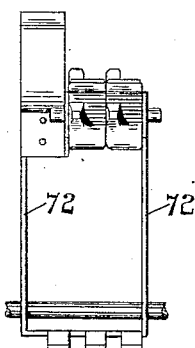
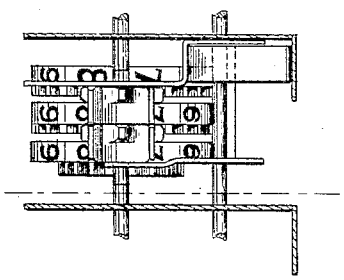
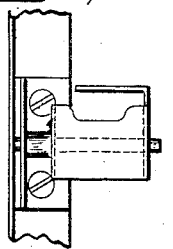
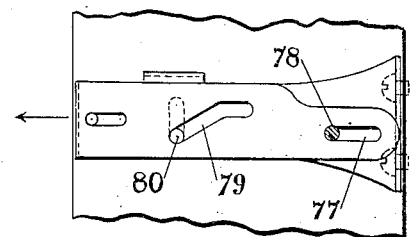
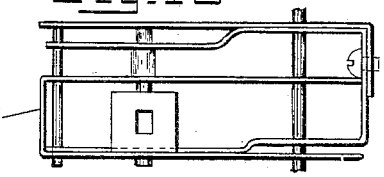
Witnesses
J. Stephen Ginta
Fred Englert
Inventor
R. McKenzie.
by Wilkinson
& Fisher.
Attorneys.

No. 865,052. PATENTED SEPT. 3, 1907.
R. McKENZIE.
VOTING MACHINE.
APPLICATION FILED MAR. 2, 1901.
23 SHEETS—SHEET 7.
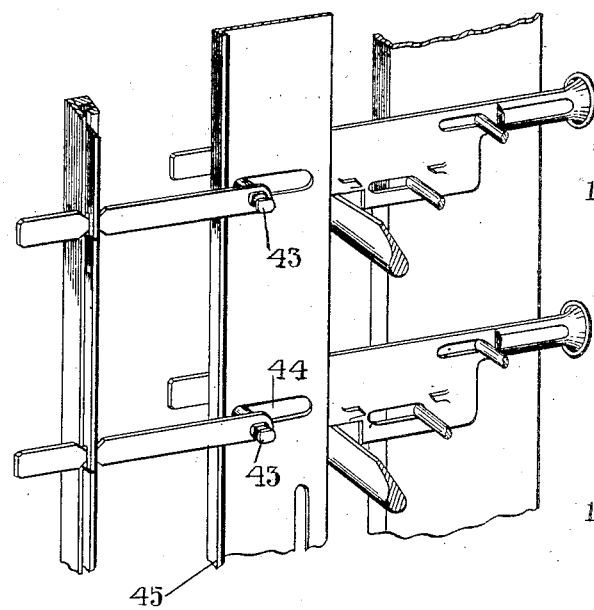
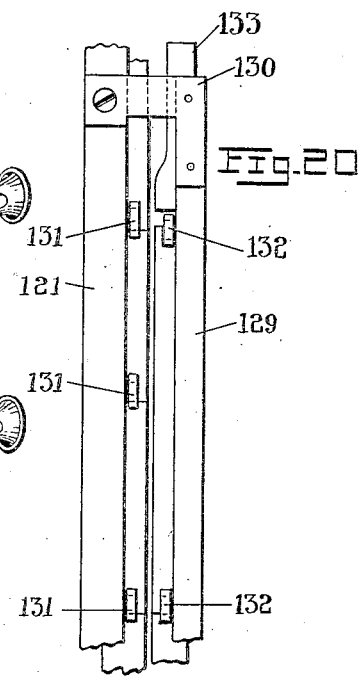
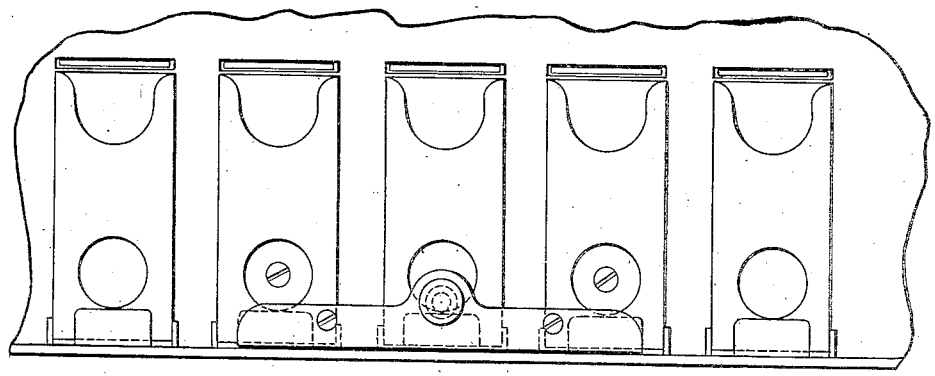
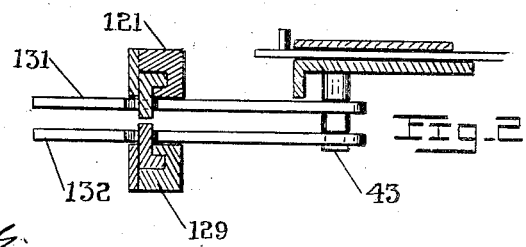
Witnesses
Inventor
R. McKenzie
by Wilkinson & Fisher
Attorneys No. 865,052. PATENTED SEPT. 3, 1907.
R. McKENZIE.
VOTING MACHINE.
APPLICATION FILED MAR. 2, 1901.
23 SHEETS—SHEET 8.
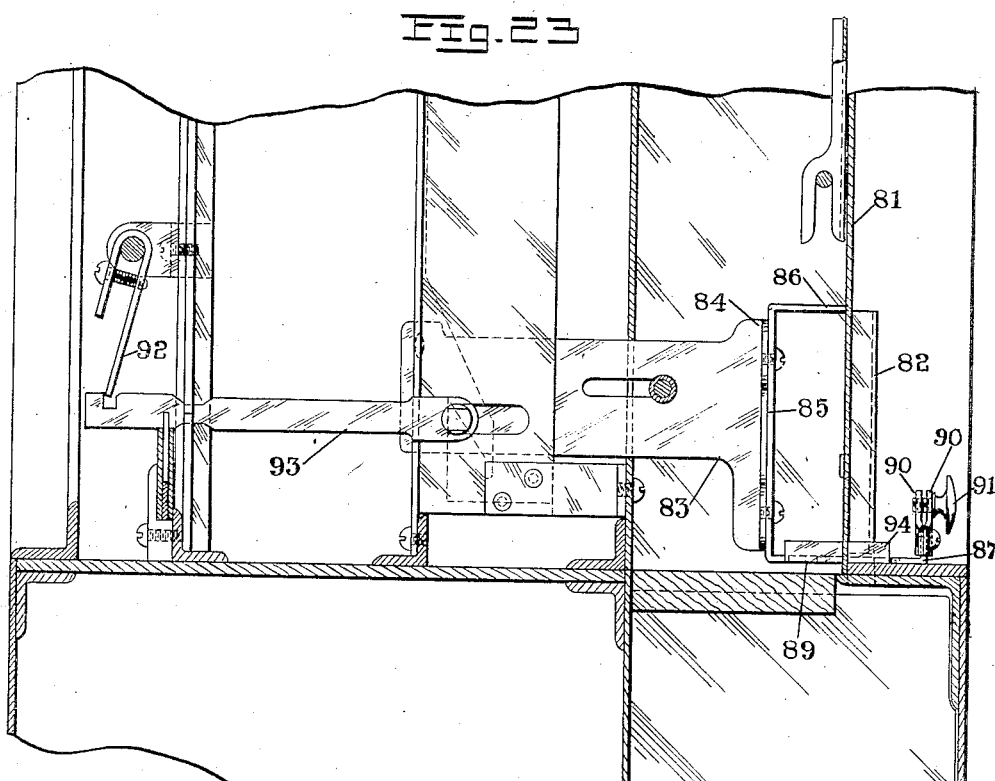
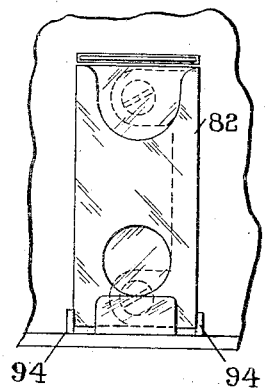
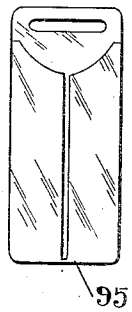
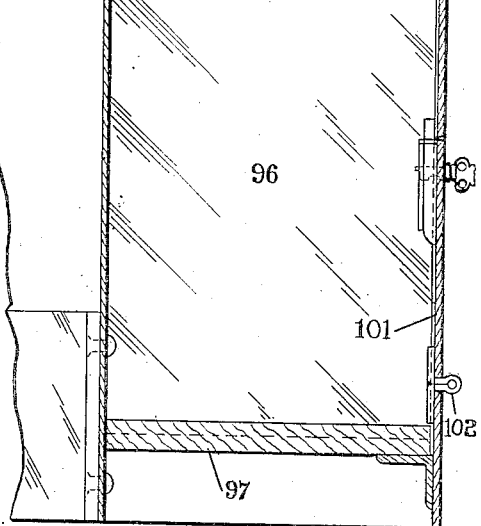
Witnesses
J. Stephen Ninsta
Fred Englert
Inventor
R. McKenzie
by Wilkinson & Fisher
Attorneys No. 865,052. PATENTED SEPT. 3, 1907.
R. McKENZIE.
VOTING MACHINE.
APPLICATION FILED MAR. 2, 1901.

23 SHEETS—SHEET 9.

Witnesses
Stephen Kusta
Fred Englert

Inventor
R. McKenzie
by Wilkinson & Fisher
Attorneys.

No. 865,052. PATENTED SEPT. 3, 1907.
R. McKENZIE.
VOTING MACHINE.
APPLICATION FILED MAR. 2, 1901.
23 SHEETS—SHEET 10.
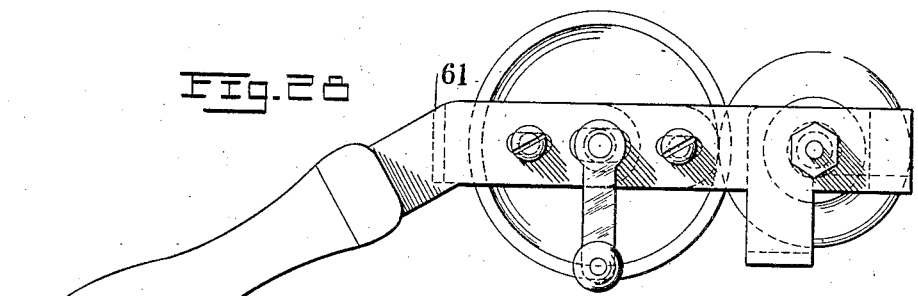
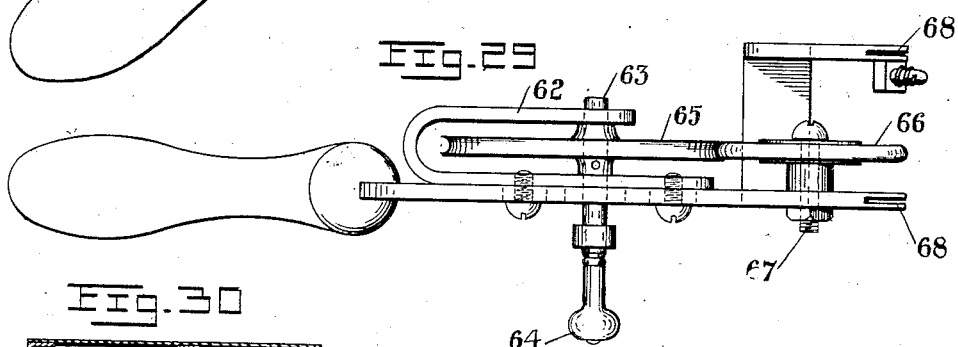
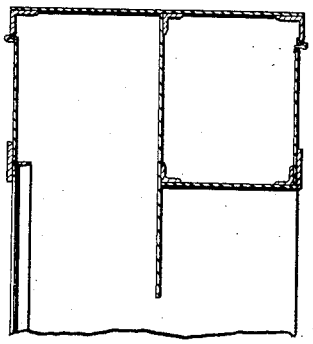
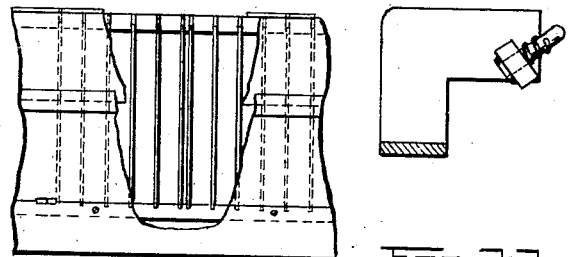
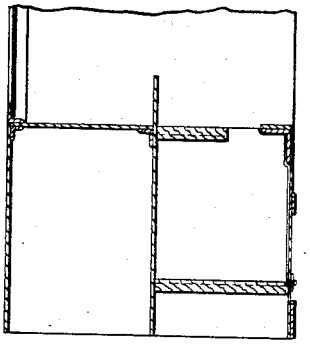
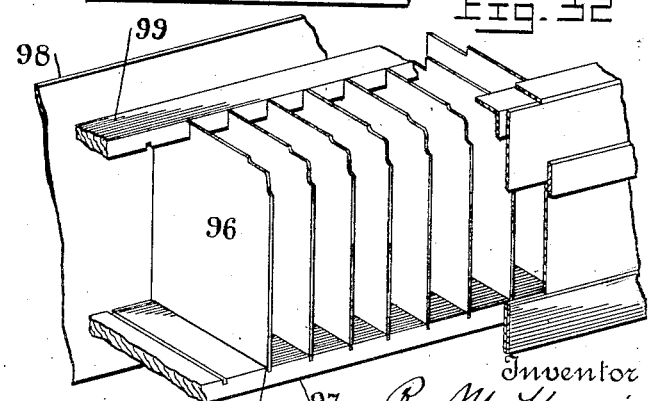

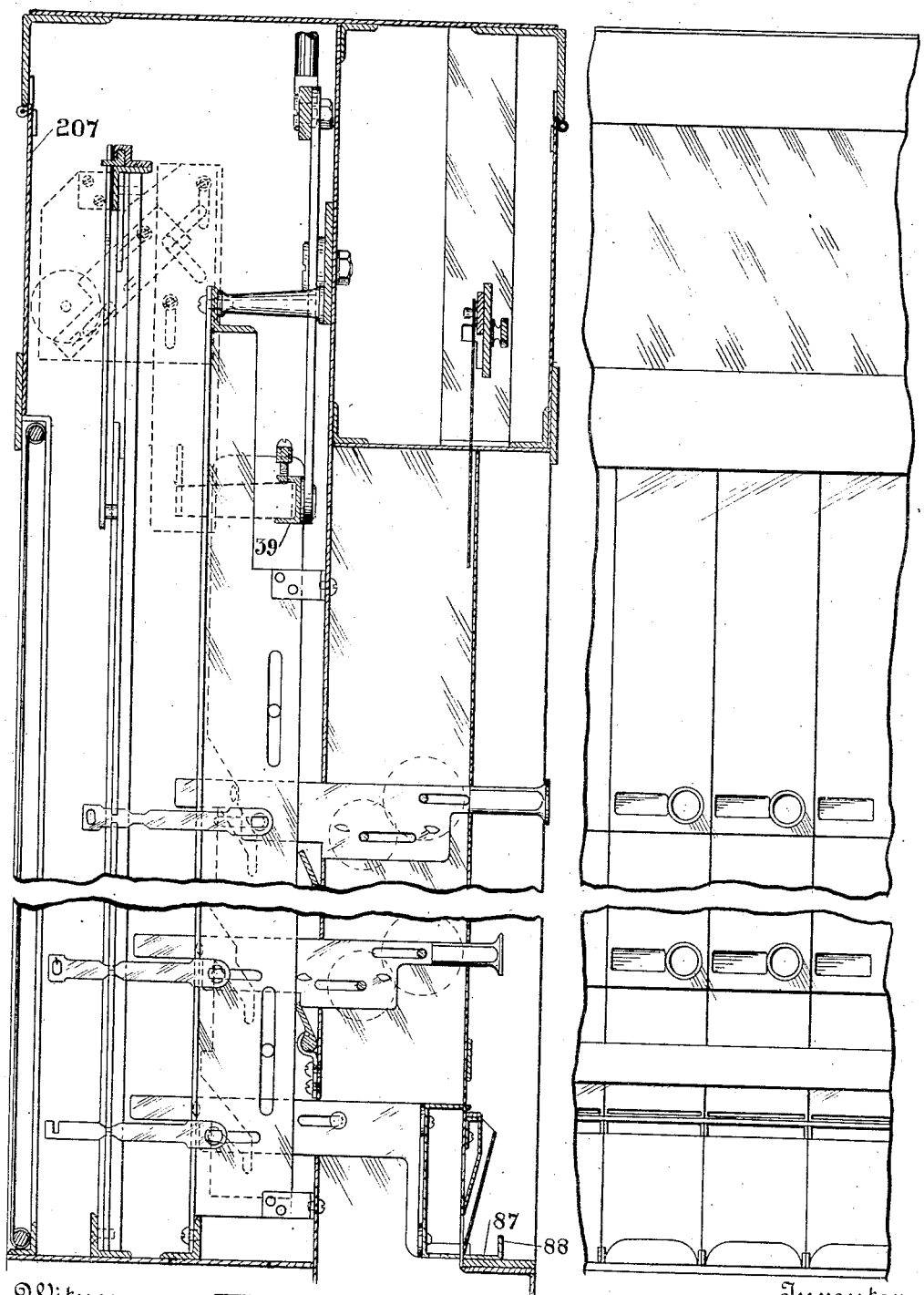

No. 865,052. PATENTED SEPT. 3, 1907.
R. McKENZIE.
VOTING MACHINE.
APPLICATION FILED MAR. 2, 1901.
23 SHEETS—SHEET 12.
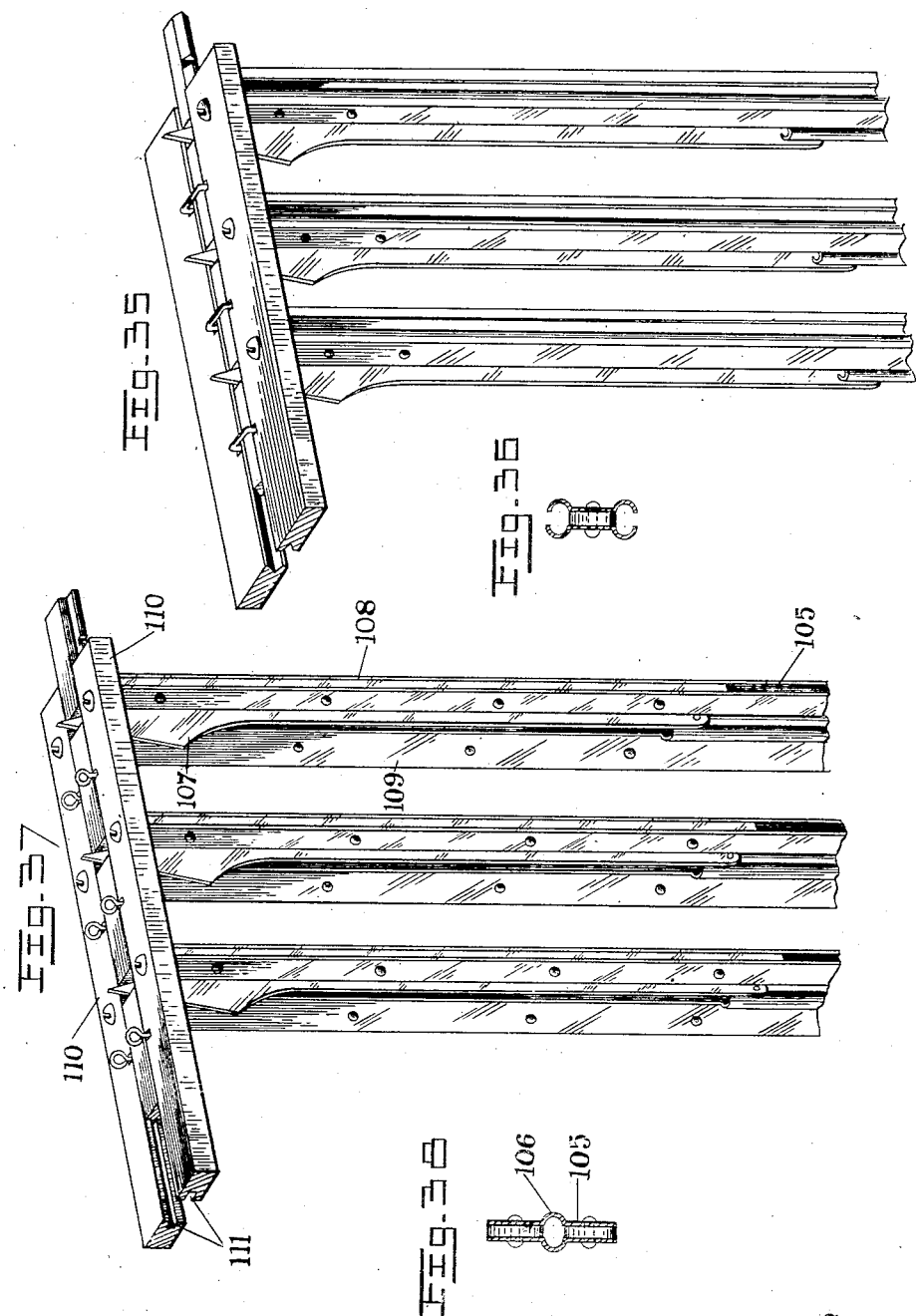
Witnesses
J Stephen Ginota
Fred E Englert
Inventor
R. McKenzie
by Wilkinson & Fisher
Attorneys No. 865,052. PATENTED SEPT. 3, 1907.
R. McKENZIE.
VOTING MACHINE.
APPLICATION FILED MAR. 2, 1901.
23 SHEETS—SHEET 13.
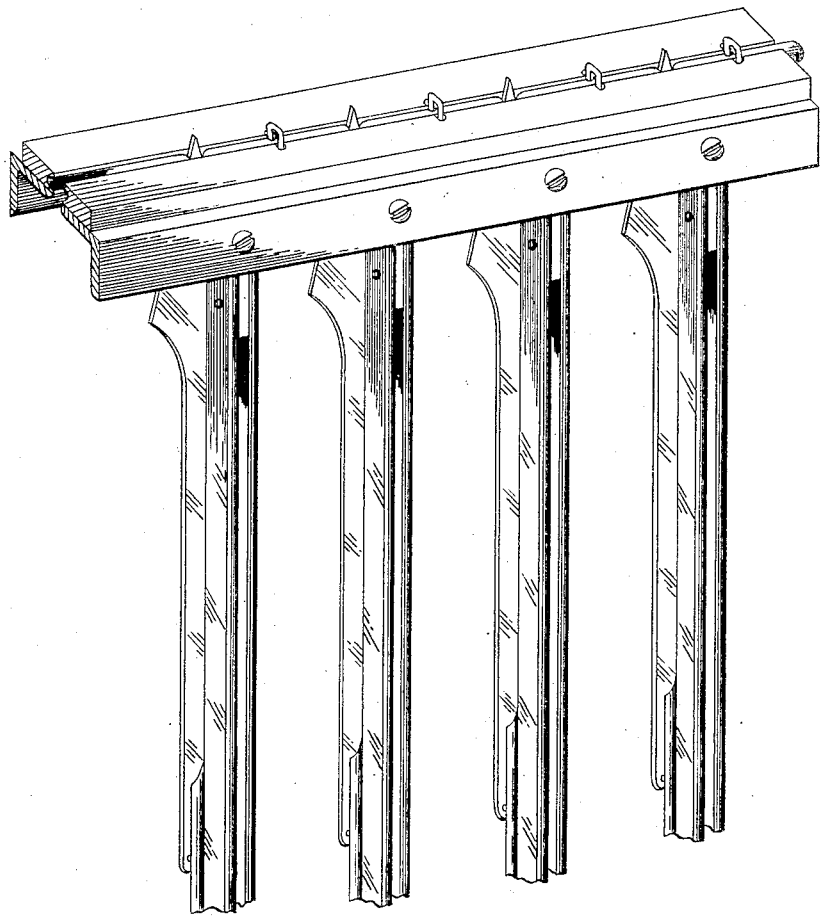

No. 865,052. PATENTED SEPT. 3, 1907.
R. McKENZIE.
VOTING MACHINE.
APPLICATION FILED MAR. 2, 1901.
23 SHEETS—SHEET 14.
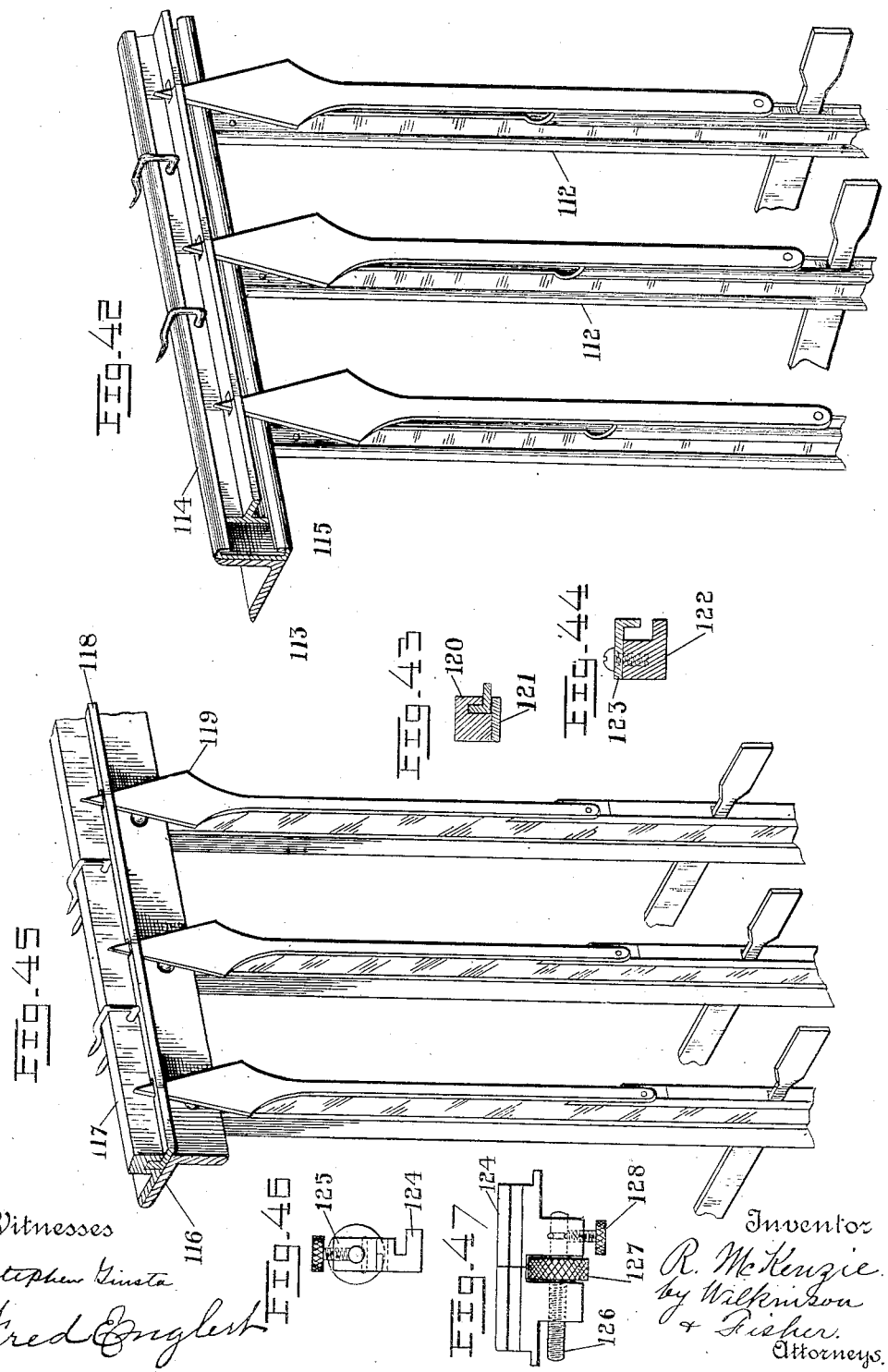

No. 865,052. PATENTED SEPT. 3, 1907.
R. McKENZIE.
VOTING MACHINE.
APPLICATION FILED MAR. 2, 1901.
23 SHEETS—SHEET 15.
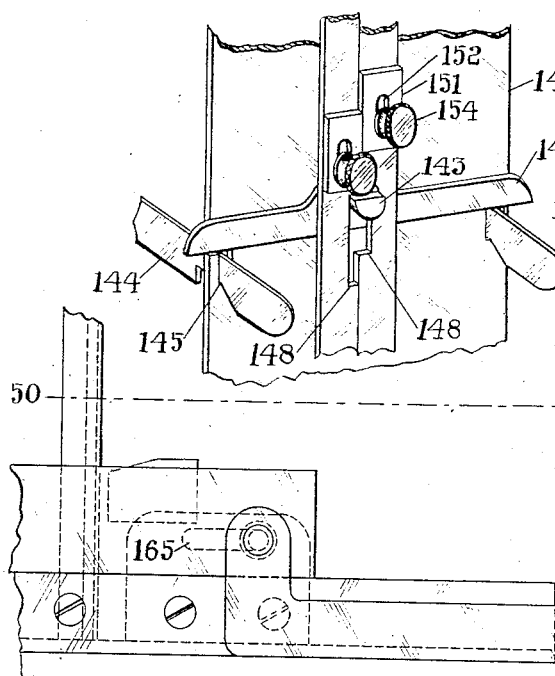
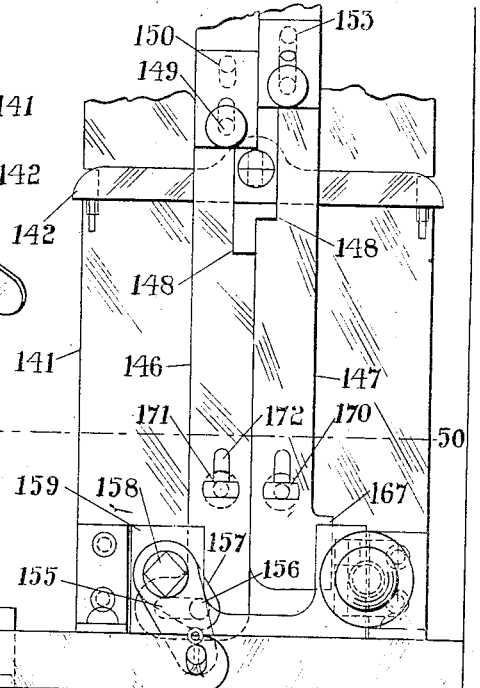
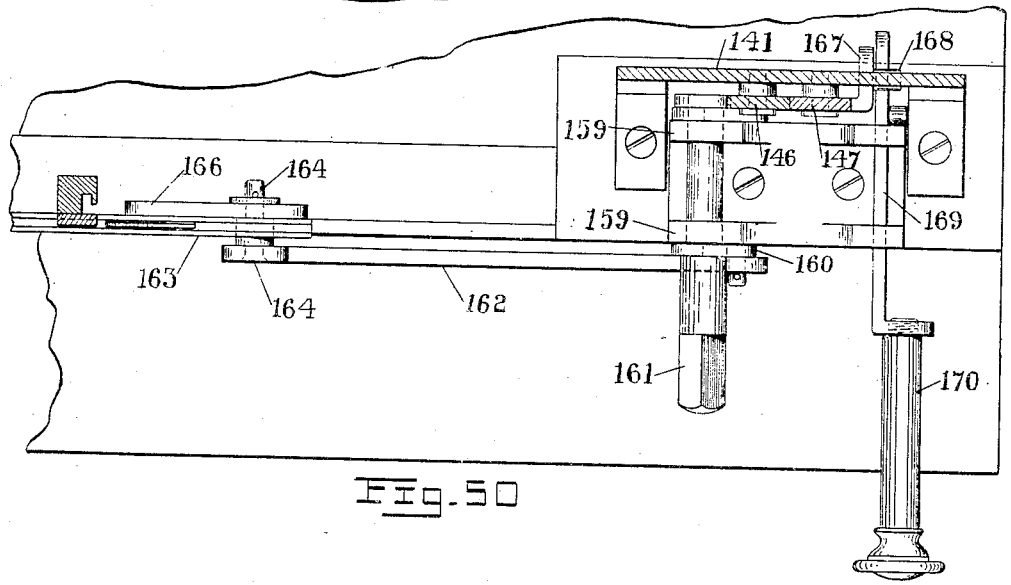
Witnesses
Stephen Giusta
Fred Englert
Inventor
R. McKenzie
by Wilkinson & Fisher
Attorneys No. 865,052.  
R. McKENZIE.  
VOTING MACHINE.  
APPLICATION FILED MAR. 2, 1901.

PATENTED SEPT. 3, 1907.

23 SHEETS—SHEET 16.

Witnesses  
J. Stephen Ginsta  
Fred Englert

Inventor  
R. McKenzie  
by Wilkinson & Fisher  
Attorneys

No. 865,052.
PATENTED SEPT. 3, 1907.
R. McKENZIE.
VOTING MACHINE.
APPLICATION FILED MAR. 2, 1901.
23 SHEETS—SHEET 17.
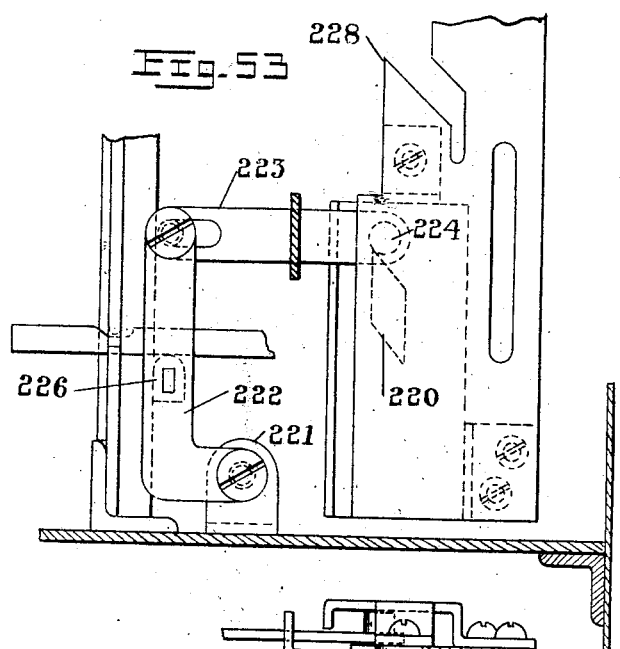
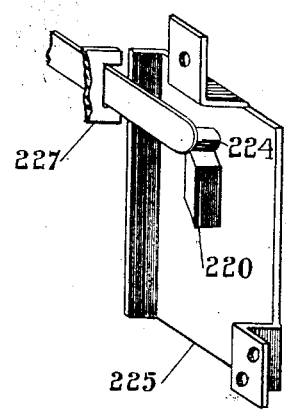
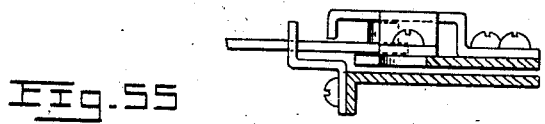
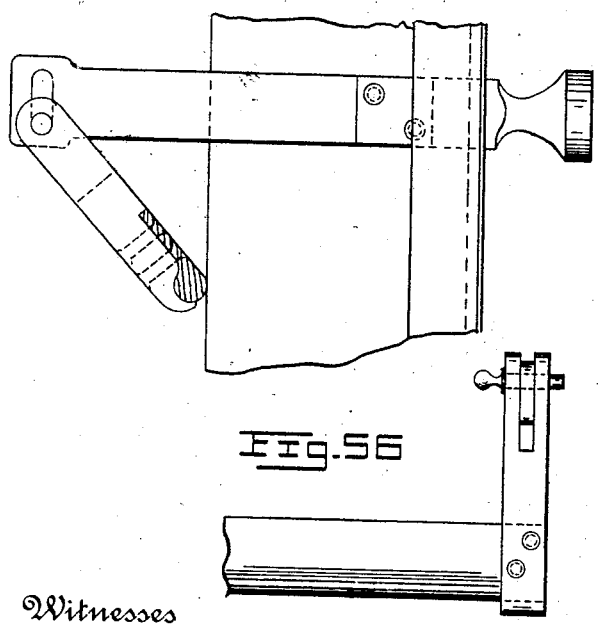
Witnesses
Stephen Ginsta.
Fred Englert.
Inventor
R. McKenzie
by Wilkinson & Fisher
Attorneys.

No. 865,052. PATENTED SEPT. 3, 1907.
R. McKENZIE.
VOTING MACHINE.
APPLICATION FILED MAR. 2, 1901.
23 SHEETS—SHEET 18.
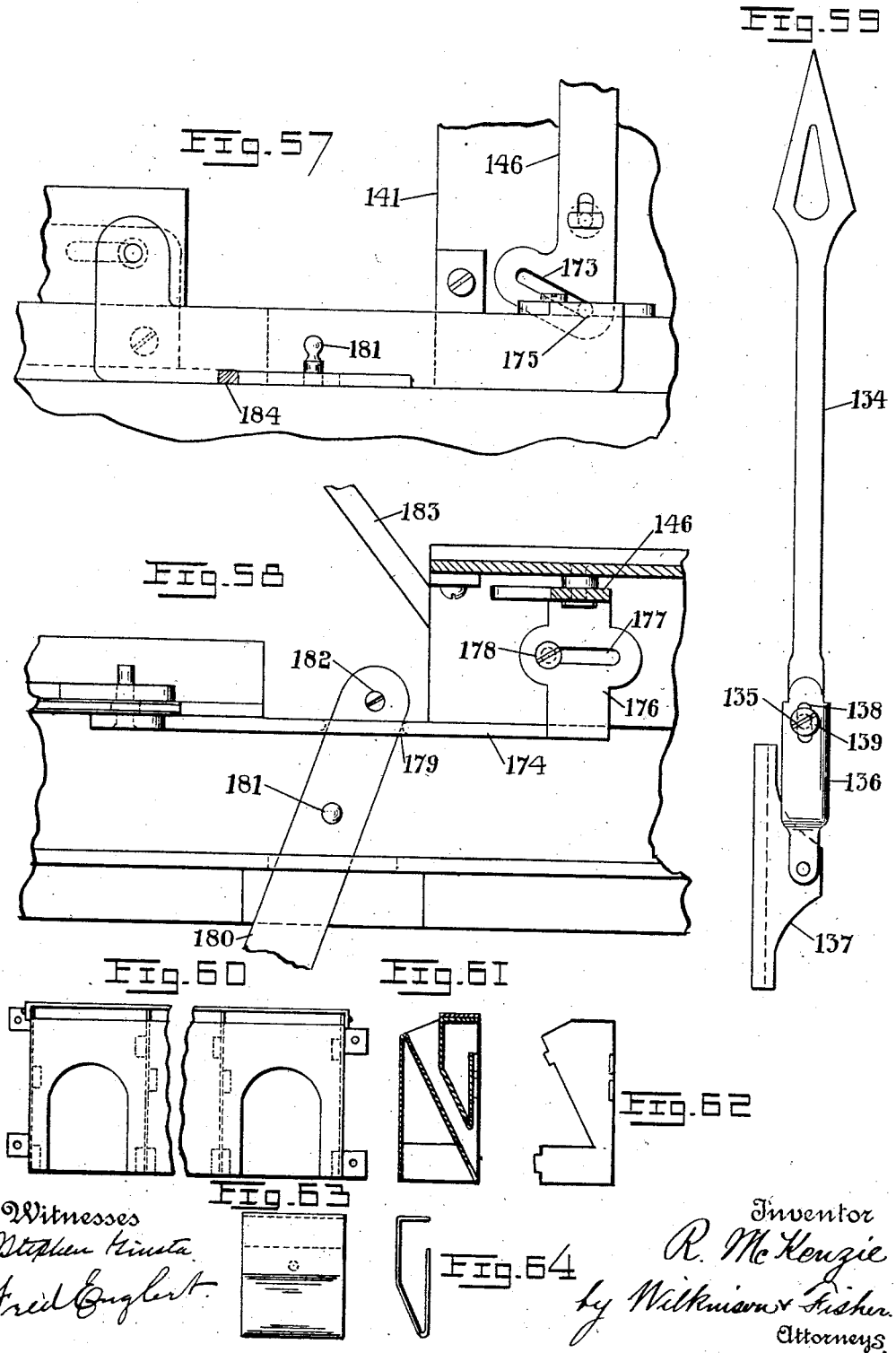

No. 865,052.　　　　　　　　　　　　　PATENTED SEPT. 3, 1907.
R. McKENZIE.
VOTING MACHINE.
APPLICATION FILED MAR. 2, 1901.

23 SHEETS—SHEET 19.

Witnesses　　　　　　　　　　　　　Inventor
　　　　　　　　　　　　　　　　　R. McKenzie.
　　　　　　　　　　　　　by Wilkinson & Fisher,
　　　　　　　　　　　　　　　　　Attorneys.

No. 865,052. PATENTED SEPT. 3, 1907.
R. McKENZIE.
VOTING MACHINE.
APPLICATION FILED MAR. 2, 1901.
23 SHEETS—SHEET 20.
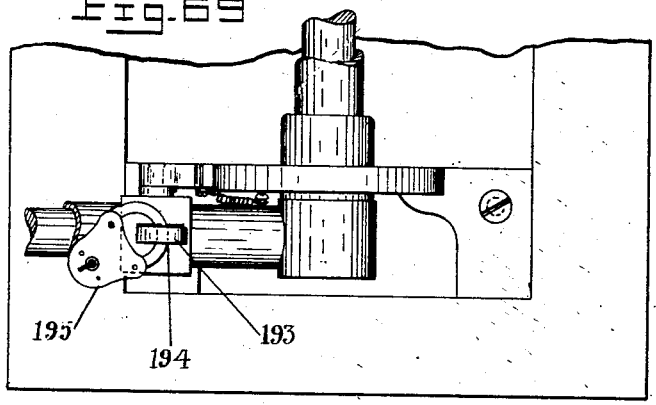
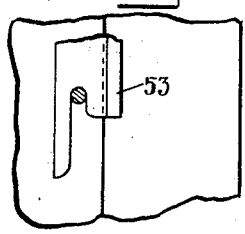
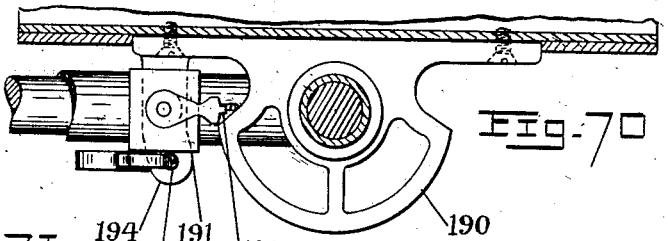
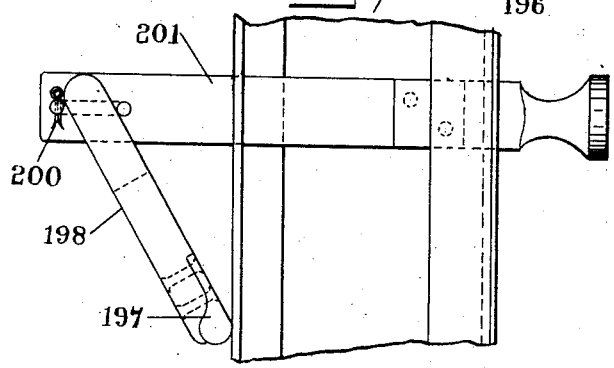
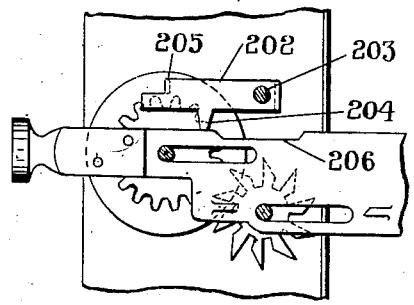
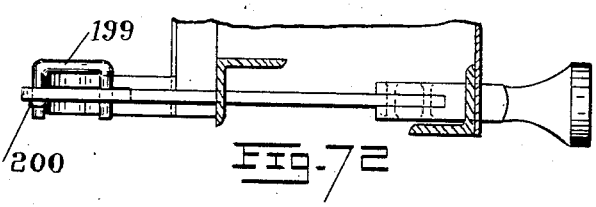
Witnesses
Inventor
R. McKenzie
by Wilkinson & Fisher
Attorneys

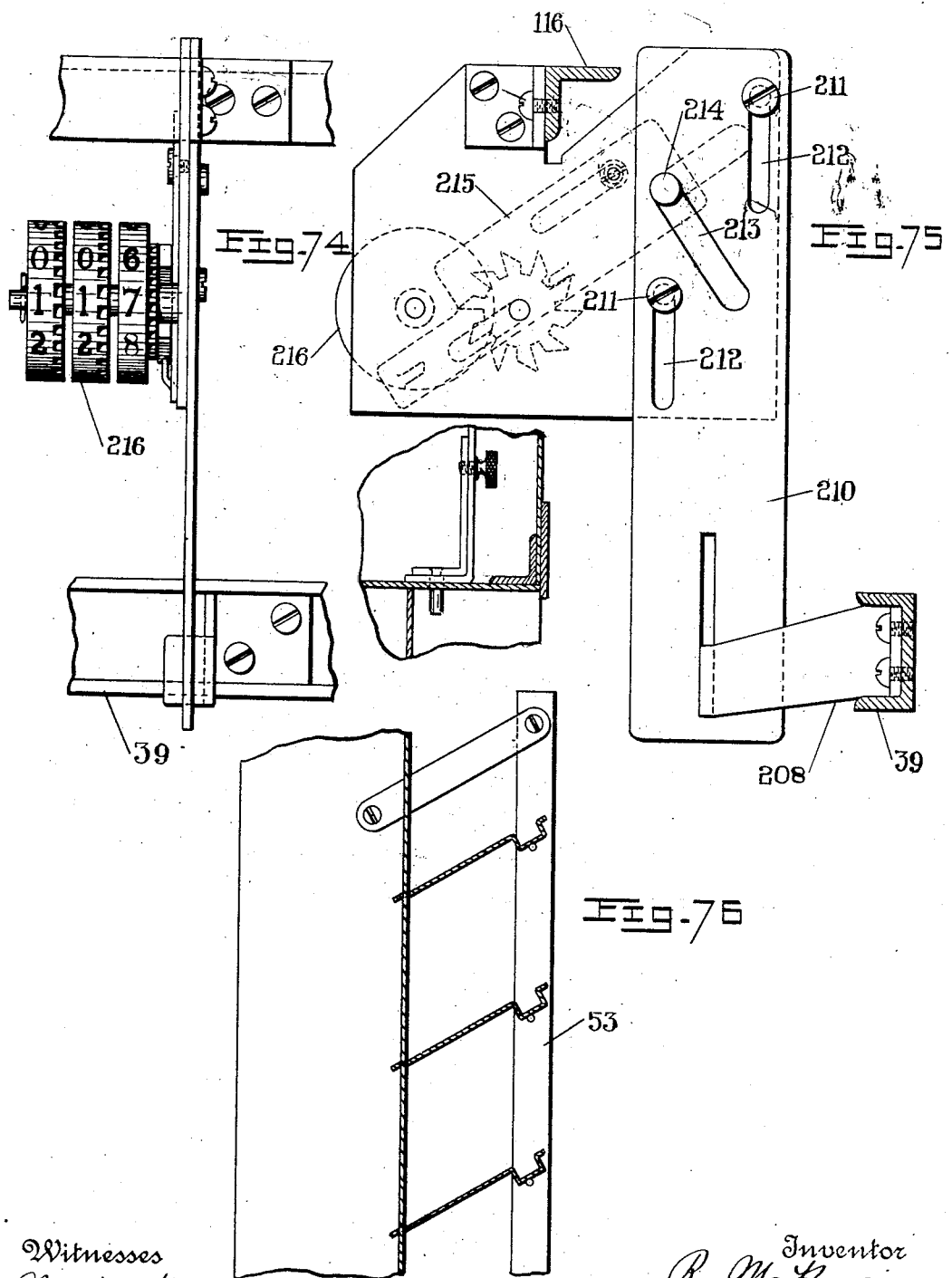

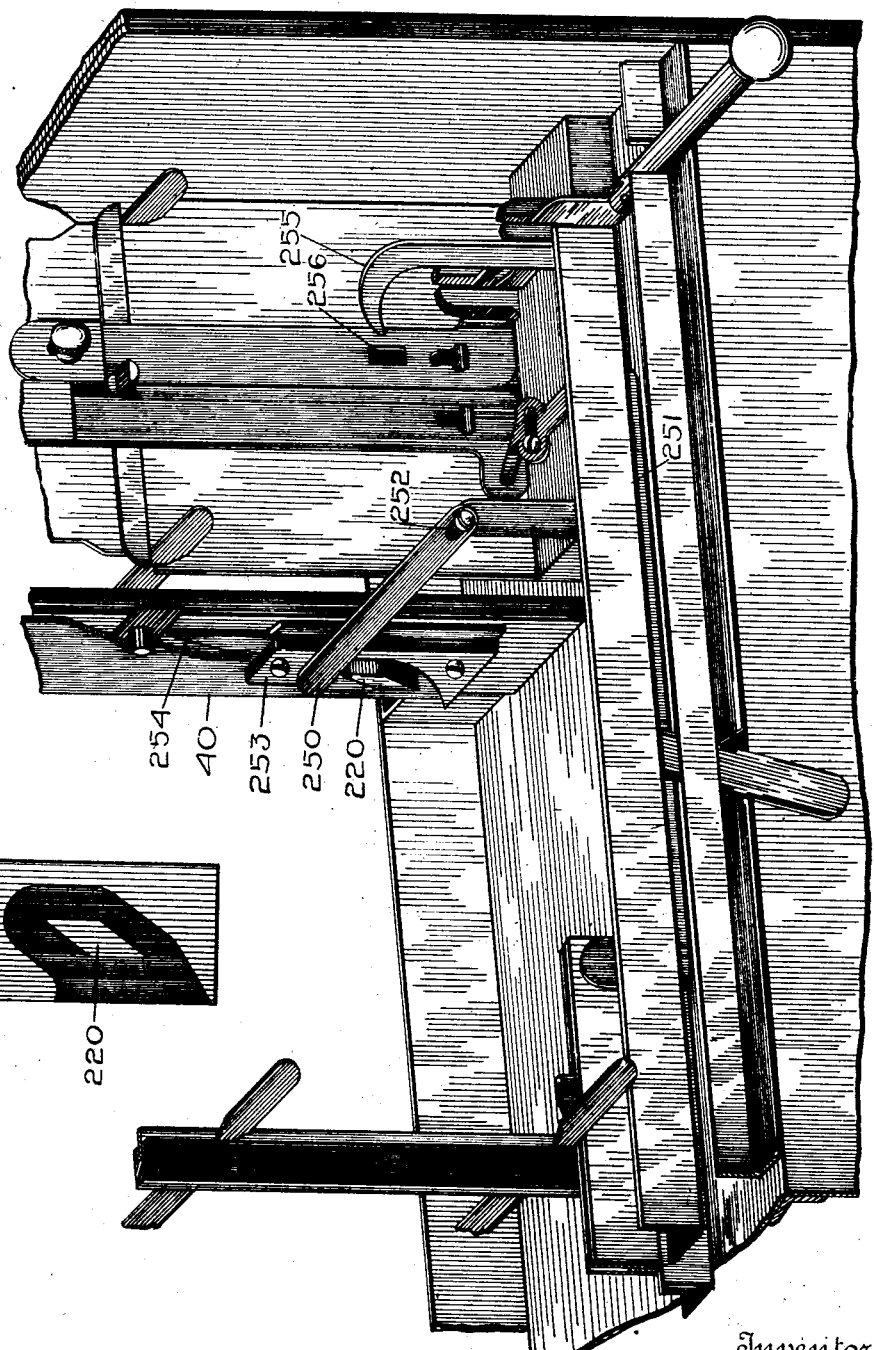

No. 865,052. PATENTED SEPT. 3, 1907.
R. McKENZIE.
VOTING MACHINE.
APPLICATION FILED MAR. 2, 1901.

23 SHEETS—SHEET 23.

Witnesses
Inventor
R. McKenzie
by Wilkinson & Fisher
Attorneys

UNITED STATES PATENT OFFICE.

RODERICK McKENZIE, OF JAMESTOWN, NEW YORK, ASSIGNOR TO THE U. S. STANDARD VOTING MACHINE COMPANY, OF JAMESTOWN, NEW YORK, A CORPORATION OF NEW YORK.

VOTING-MACHINE.

No. 865,052.      Specification of Letters Patent.      Patented Sept. 3, 1907.

Application filed March 2, 1901. Serial No. 49,640.

*To all whom it may concern:*

Be it known that I, RODERICK MCKENZIE, a citizen of the United States, residing at Jamestown, in the county of Chautauqua and State of New York, have invented certain new and useful Improvements in Voting-Machines; and I do hereby declare the following to be a full, clear, and exact description of the invention, such as will enable others skilled in the art to which it appertains to make and use the same.

My present invention has for its object to provide an improved voting machine particularly of the type described in the application of Angus McKenzie, Serial #732,393, filed in the Patent Office, October 2nd, 1899, in which the interchangeable interlocking and operating mechanism of the machine is organized in single candidate groups.

My invention consists particularly in a new type of interlocking channel and the method of constructing the same, a reversal of the movement of the key, a screw adjusting block, for taking up the lost motion in multi-candidate groups, a new full stroke device of the turn stile with a locking device therefor, a new type of front plates with means for securing them in position, a resetting counter, a totalizing counter, a new free ballot mechanism, a new guide for yokes, a new means for connecting up the irregulars in a multi-candidate group, a free ballot receiving box, a re-setting tool, a new type of Yes and No lockout, together with many other general improvements upon the machine such as are described in the accompanying specifications, and pointed out in the claims appended thereto.

Figure 7:
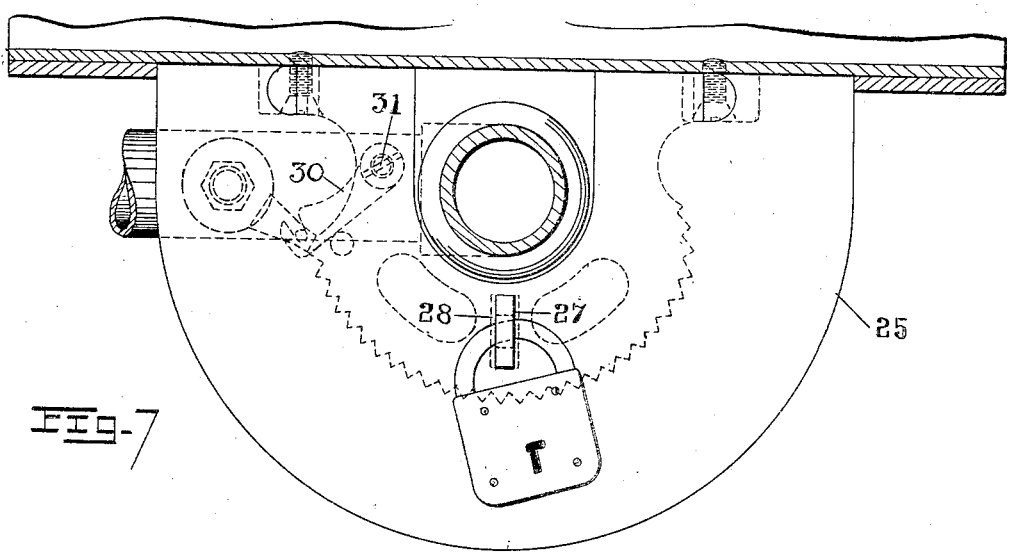
Figure 8:
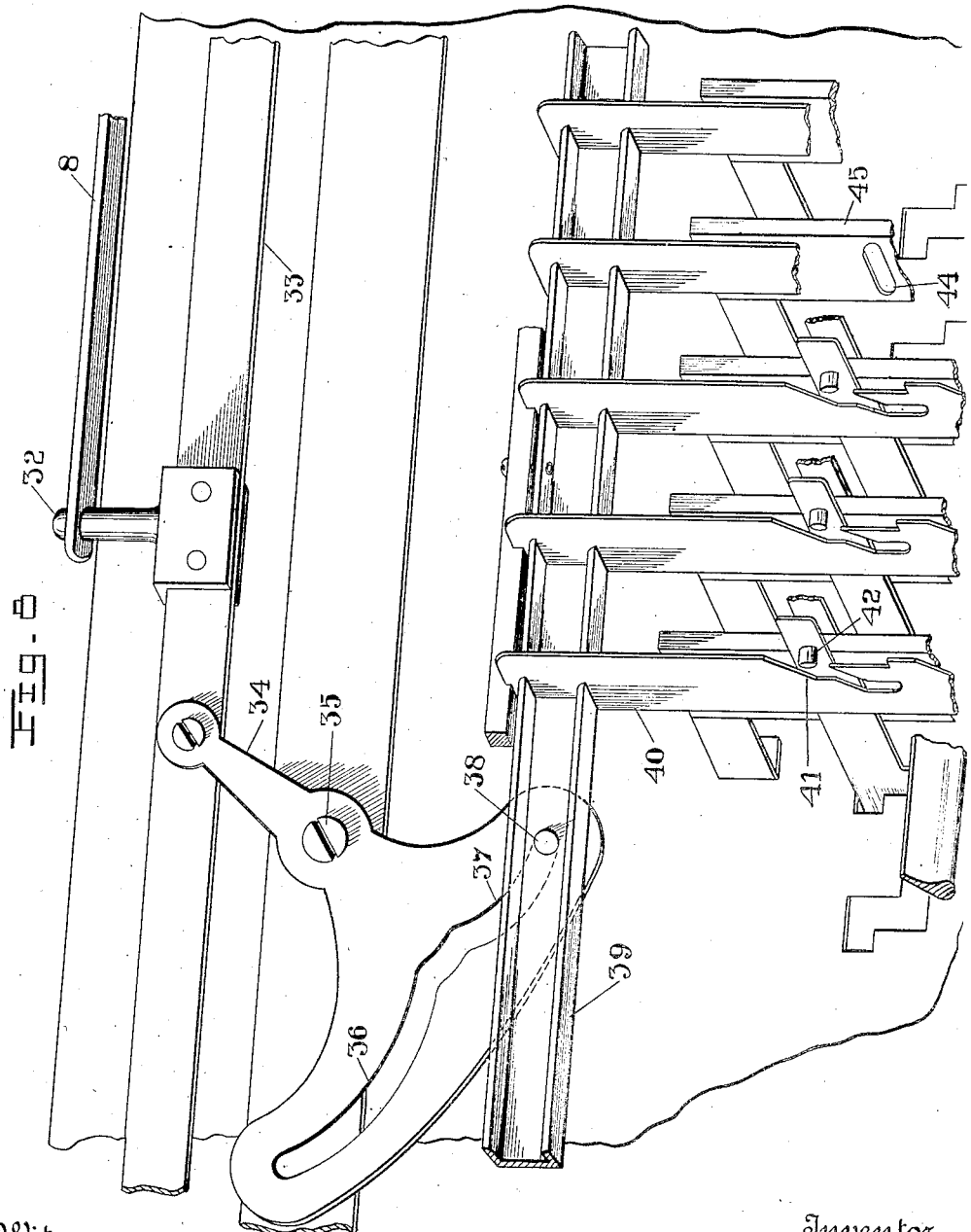
Figure 26:
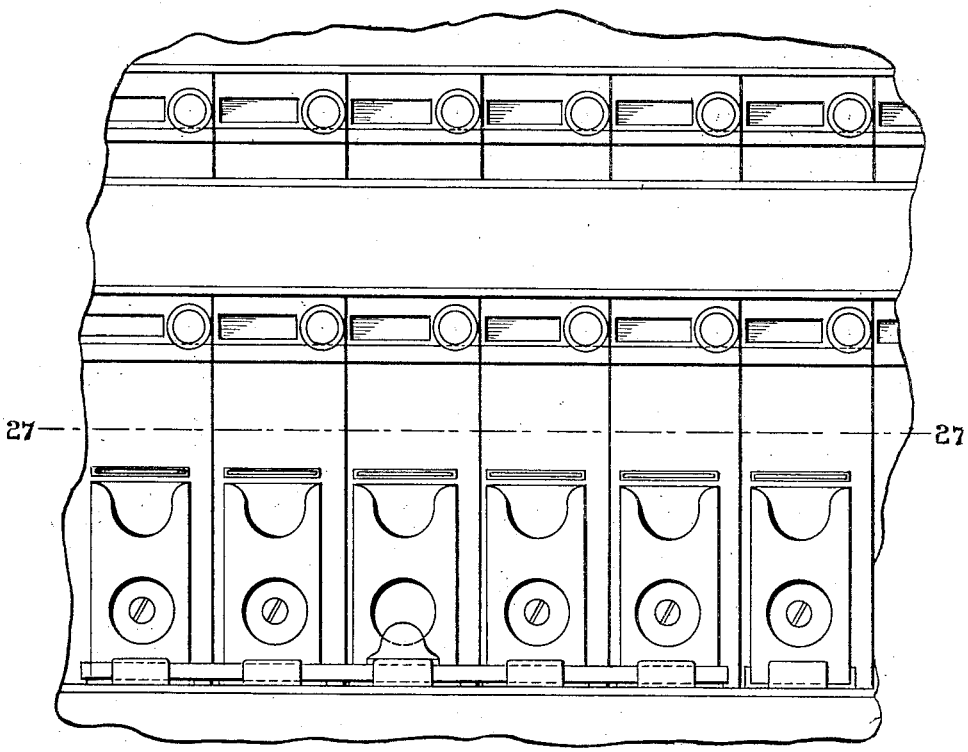
Figure 27:
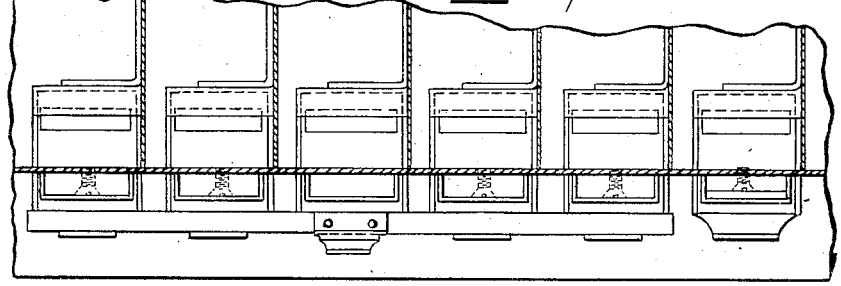
Figure 51:
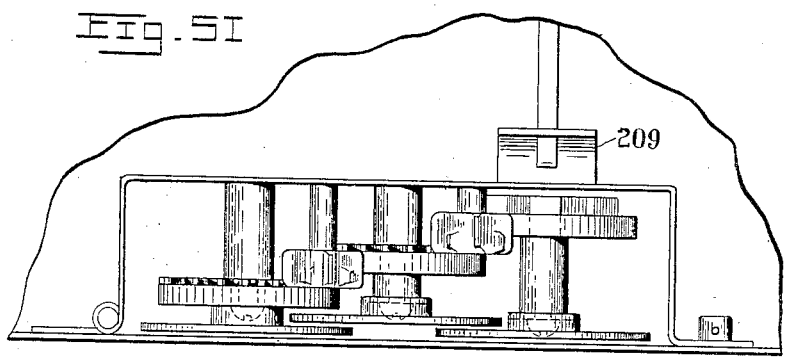
Figure 52:
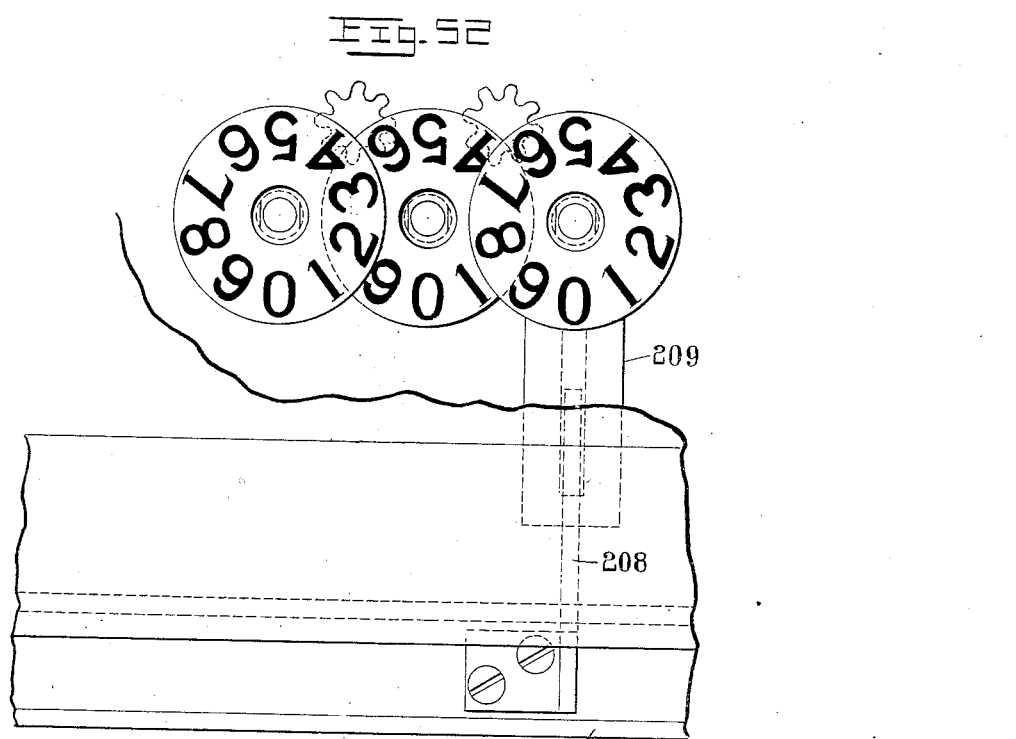
Figure 65:
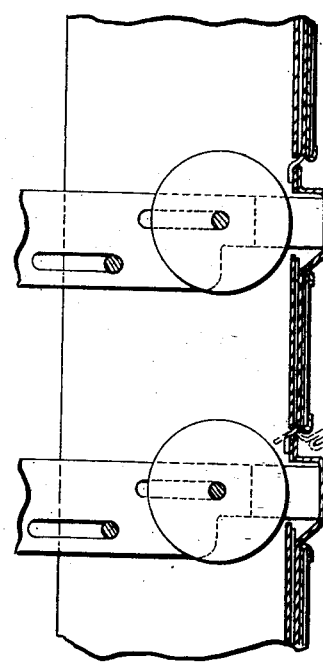
Figure 66:
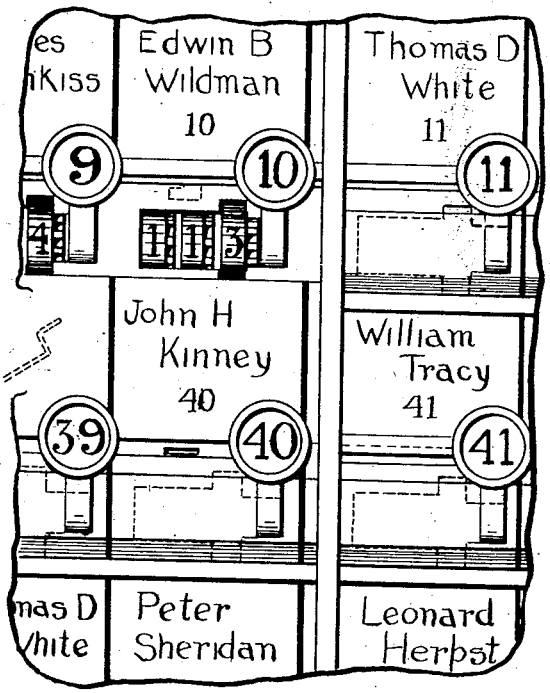
Figure 67:
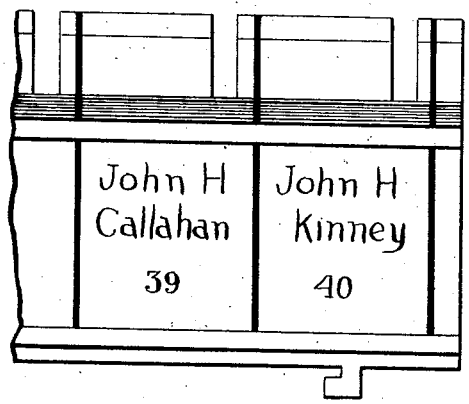
Figure 78:
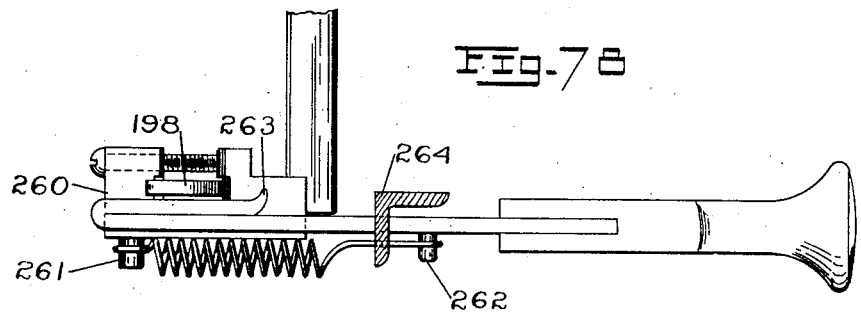
Figure 79:
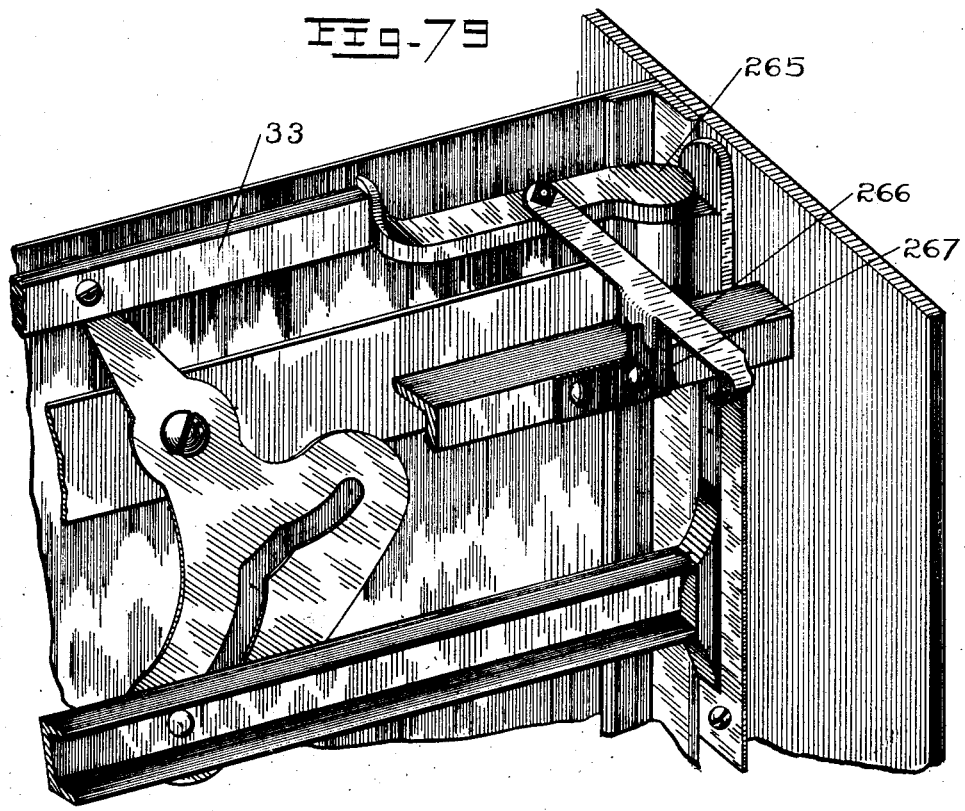

In the accompanying drawings, Figure 1 shows a front view of the machine provided with a curtain. Fig. 2 is a top plan view of the machine showing means for moving the curtain divided in two parts. Fig. 3 is a top plan view of the machine showing means for driving the curtain. Fig. 4 is a front view of the machine with the curtain drawn. Fig. 5 is a top plan view of the machine shown in Fig. 3. Fig. 5ᵃ is a detail showing the connection between the driving parts and the curtain. Fig. 6 is an elevation of the full stroke device and lock on the turn stile. Fig. 7 is a top plan view of the same. Fig. 8 is a perspective view showing the driving mechanism of the machine. Fig. 9 is a vertical transverse section of the machine showing the keys and counters and the face plate with the pivoted sections thereon, and the universal bar. Fig. 10 is a front view of the face plate and counter shown in Fig. 9. Fig. 11 shows the stay for holding the pivoted face plate in position. Fig. 12 shows the resetting counter. Fig. 13 is a side elevation of the counter shown in Fig. 12. Fig. 14 is a detail view showing the frame which carries the transverse gears in Figs. 12 and 13. Fig. 15 is a top plan view of the counter shown in Figs. 12, 13 and 14. Figs. 16, 17 and 18 show another form of construction by which the transfer gears may be thrown out of connection with the counter wheels. Fig. 19 is a skeleton view showing the counter angles, yoke, straight ticket rock shaft, guide angle, interlocking wedges, and channel. Fig. 20 shows the regular interlocking channel and indorsement channel thereon. Fig. 21 shows the irregular balloting boxes at the bottom of the machine. Fig. 22 shows in cross section the guide angle, yoke, regular interlocking wedge, and channel therefor, and the indorsed candidate interlocking wedge and the channel for it. Fig. 23 is a transverse vertical section of the lower part of the machine showing the face plate, counter shutter, irregular balloting device with the interlocking device therefor, and the receptacle for the free ballot tickets. Fig. 24 is a front view of the irregular balloting devices. Fig. 25 is the holder for the irregular ballot. Fig. 26 is a front elevation of the keyboard of the machine showing the irregular balloting devices at the bottom and a way for connecting a plurality of them together. Fig. 27 shows a horizontal section on the line 27—27 in Fig. 26. Fig. 28 shows the resetting tool in elevation. Fig. 29 is a top plan view of the same. Fig. 30 shows the bottom of the machine where the irregular ballots are received when cast. Figs. 31 and 32 show how the compartments are made for the reception of the irregular ballots of individual offices. Fig. 33 shows a transverse section of a machine which shows substantially all of the operating parts therein. Fig. 34 shows the front elevation of the keyboard of the machine. Fig. 35 shows the upright interlocking channel such as is described in the application Angus McKenzie, #722,393, together with a new type of interlocking channel at the top. Fig. 36 is a cross section of the upright channel in Fig. 35. Fig. 37 shows the top interlocking channel supported on both sides of the upright interlocking channel. Fig. 38 is a cross section of said upright interlocking channel. Fig. 39 shows still another variation of the top interlocking channel such as is shown in Fig. 35. Figs. 40 and 41 show the blocks for the interlocking channel shown in Fig. 39. Fig. 42 shows the interlocking and upright channel such as is shown in Fig. 35, at the top of which is the interlocking channel for the spear heads which is one of my new designs. Figs. 43 and 44 show a cross section of a new design of interlocking channels invented by myself. Fig. 45 shows an upright channel shown in Fig. 43, together with a new form of top interlocking channel. Figs. 46 and 47 show the screw adjusting block of my invention. Fig. 48 is a perspective showing my improved form of Yes and No lockout. Fig. 49 is a rear elevation of my improved Yes and No lockout. Fig. 50 is a cross section of my Yes and No lockout on the line 50—50 in Fig. 49. Fig. 51 shows a top plan view of an improved form of public counter. Fig. 52 shows an elevation of the public counter shown in Fig. 51. Figs. 53 and 54 show my invention for preventing the beating of the machine. Fig. 55 shows a straight ticket key rock shaft in side elevation. Fig. 56 is a rear view for same. Fig. 57 shows the new means of connecting the Yes and No part of the woman's lockout with the part which locks out the groups of candidates, together with the operating means therefor. Fig. 58 is a top plan view of the part shown in Fig. 57. Fig. 59 shows the top most block of the upright channel with the adjustable spear head carried thereon. Figs. 60, 61, 62, 63, and 64 show the details of construction of a new form of free balloting device. Fig. 65 is a sectional elevation showing another way of hinging the shutters to the front plate. Fig. 66 shows a front view of said front plate with the stay for holding the shutters in position. Fig. 67 shows a portion of one side of the front plate with the leg or hook stamped thereon, which hinges with the front plate. Fig. 68 shows means for locking the front plate stay in position. Figs. 69 and 70 show the locking device for the gate. Figs. 71 and 72 show the straight ticket key in connection with the rock shaft. Fig. 73 shows a device whereby the counter is kept continually locked. Figs. 74 and 75 show a form of public counter. Fig. 76 shows the front plate stay for the pivoted shutters. Fig. 77 is a view of the lower right hand corner of the rear of the machine. Fig. 78 is a view of an improved form of straight ticket key. Fig. 79 shows the means by which the machine may be locked. Fig. 80 is a detail of the cam 253 shown in Fig. 77.

Like numbers refer to the same parts in the specifications and drawings:

In Fig. 1, I have shown a front elevation of my improved voting machine with the curtain which conceals the keyboard drawn so as to conceal the keyboard from observation, in which position the indicators or voting keys are left in their unlocked position. The body of the voting machine (1) is mounted upon the legs 2—2 which are detachably connected to the sides at 3—3, and the braces 4—4 are used to steady the machine on its legs. On the left hand end of the machine as shown in Fig. 3 the upright shaft 5 is carried with a gate 6 provided thereon, by means of which said upright shaft is swung through an arc of 180 degrees. At the top of said shaft is a crank 7 by means of which the connecting rod 8 is reciprocated, which connecting rod operates the working parts on the interior of the machine. The second connecting rod 9ª connects to the first connecting rod 8, and by means of a loose connection 10 with the lever 11 a curtain is swung to alternately expose and conceal the keyboard after and before voting.

In Figs. 3, 5 and 5ª I have shown a single arm for operating the curtain, which arm swings through a distance of about one hundred degrees.

In Fig. 2 I have shown two arms for operating the curtain which is divided into two parts, and a mechanical movement by means of which the movement of the connecting rod in one direction will swing the two arms toward or away from each other. For this purpose the connecting rod 8 has the second connecting rod 9ª attached thereto, which is movable longitudinally, and which carries thereon the two pins 12—13 which connect to the levers or arms 14 and 15. The arm 14 is pivoted at 16 while the arm 15 is pivoted at 17. In consequence of this, as the connecting rod 9 moves to the right in Fig. 2 the arm 14 will swing to the left and the arm 15 will swing to the right or opposite direction, and the two arms be secured by the connecting rod being connected to the one arm on one side of its pivot and to the other arm on the other side of its pivot. The curtain in both cases travels on a guide 18 such as is shown in Figs. 3 and 5, from which it is suspended by rings or in any other suitable manner or convenient way.

In Figs. 6 and 7 I have shown the shaft 5 on the end of the machine with the full stroke device and locking device which govern the movements of said shaft. An arm 20 extends at right angles to the bottom of the shaft and a similar arm extends parallel to it at the top of the shaft, which arms support the gate 6 in Fig. 3. The arm 20 supports a stud 21 upon which is secured a pawl 22 held yieldingly to a position parallel with the arm 20, so that said pawl 22 is always in engagement with the ratchet 24 as the gate swings backward and forward, except for a short distance at each end of the stroke where a blank space is left to secure the reversal of the position of the pawl on the ratchet during the return stroke. Covering the pawl and ratchet which consists of a full stroke device, is the plate 25 pivoted at 26—26 so as to be swung upward, through the plate 25 is pierced a hole 27 through which a hasp 28 extends, which hasp is provided with a hole near its top so that a padlock can be passed therethrough locking down the plate 25 for a purpose to be described. Carried on the plate 25 is a pin 29 projecting downwards. Carried on the ratchet or full stroke device is a hook 30 pivoted at 31. The pin 29 can hold the hook 30 in position either on the right or left of said pin 29, and for the purpose of locking the machine the plate 25 can be raised and the pawl 22 swung to the position shown in Fig. 7, in which position a pin carried on the top thereof can be engaged by the hook 30 and by closing down the plate 25 the pin 29 locks the hook 30 in position, which in turn locks the pawl 22 which prevents backward movement of the gate because the pawl itself rests against the first tooth of the ratchet 24 and the body of the machine itself prevents the gate from swinging in the opposite direction far enough to release the pawl from the hook, in consequence of which the gate is securely locked against being swung.

In Fig. 8 I have shown a perspective view of the rear portion of the machine. The connecting rod 8 fastens to a pin 32 which is carried by the bar 33 which in turn is coupled to all the rocking cams 34, said rocking cams are pivoted at 35 and have the cams 36 and 37 cut therein so that swinging the gate and reciprocating the connecting rod 8 will swing the cams and raise and lower the pins 38. The pins 38 are connected to a channel iron 39 to which in turn are connected the universal bars 40 at regular intervals, so that there is one universal bar for the keys of each single candidate group. Unlike the universal bars shown in Fig. 15 of the application #732,393 by Angus McKenzie, the universal bars in my machine are placed in a reverse position which reverses the action of the key so that instead of the key being pushed in to voting position, which is the case in said application, it is pulled out. The cams 41 are substantially the same as those referred to in the prior application, and their action upon the key is substantially the same, but being oppositely placed they produce the reverse effect upon the key above mentioned.

My improved form of voting key is shown in detail in Figs. 8/19. The key carries the stud 42 which engages with the universal bar and through which the key is reciprocated from the reciprocation of the universal bar. The key on its opposite side carries the long stud 43 shown in Figs. 9 and 19 on which are carried the interlocking fingers. This stud 43 projects through the slot 44 in the tripping bar guide angle 45 such as is shown in Figs. 8 and 19 and 22. The tripping bar guide angle is placed in the machine between the yoke on the voting key and the interlocking finger which the yoke carries. In Fig. 9 I have shown the counter carrying angles, tripping bar guide angles, tripping bar, and the yokes in their related position, together with the straight ticket rock shaft 46. In this case the key is shown terminating with a flat end 47 such as is shown in the side elevation in Fig. 9 or in the front elevation in Fig. 10.

The keyboard of the machine is made into sections which embraces ten of the single candidate groups of keys on the machine. It consists of a plate 48 punched with the openings 49, which openings are large enough to permit the counter wheels 50 to project therethrough in the manner shown in Fig. 9. Upon the plate 48 is hinged the counter shutter 51 which preferably covers all of the counters of one party row in that section of the machine. It is slotted at regular intervals to enable it to pass the voting keys as may be clearly seen in Fig. 9. Each shutter 51 carries the label holder 52, clearly indicating the candidates to whom the keys and counters belong, and when it is turned up into the full line position shown in Fig. 9 conceals the counters, and when thrown down in the dotted line position shown in Fig. 9 it exposes the counters. It is to be noted however, that the label holder of each shutter belongs to the keys and counters beneath it, while the shutter itself conceals the counters which are above it, so that when a shutter is turned down in position to expose the counter the shutter immediately above it may remain in proper position showing the names of the candidates to whom the counters belong from which counters the vote is being taken. If it is desirable to throw down all of the counter shutters at once, then I may provide label holders and labels between the counter shutters 51 and the main plate 48, so that when one side of labels is concealed by throwing down the counter shutters the other labels are exposed to view, in which case, however, the labels will be below the counters with the exception of the labels of the top row of counters which will be turned down to expose the counters. The number of the key may be painted on the plate instead of using the second set of labels, so that the counter would be connected to its candidate on the tally sheet both by the number on the key and the number on the face plate immediately under the candidate, it being understood that the candidates name on the tally sheet bears the same number, which would make the second set of labels unnecessary. These counter shutters pivoted to the main plate are locked in position by the front plate stays 53 shown in Fig. 11, which stays may be carried on links at the top and bottom thereof, which links will be pivoted to the counter carrying angles so as to give a parallel movement to the counter stay. The front plate stay may be formed as a T bar as is shown in cross section in Fig. 11, or it may be a flat piece of metal, see Fig. 76, with pins at regular intervals to catch the shutters to carry them up and lock them as the stay itself is raised to locked position, which construction I have shown in Fig. 75. By raising the stay 53 to vertical position the pivoted counter shutters are locked up against the front plate concealing the counter. The stay in turn is held in position by the vertically adjustable locking pin shown in Fig. 68. This pin can be raised by loosening the thumb screw and sliding it up. The thumb screw clamps in any position. And I have in one case preferably formed this stay of a U shaped piece of iron and have fastened the links thereto by inserting the link into the U shaped stay and passing a pin or rivet through it to hold them together. These counter shutters may be hinged to the front plate by an ordinary hinge or they may be pivoted to the front plate by stamping holes through the front plate at suitable intervals, and having upon the shutters themselves suitable projections which will pass through said holes providing a pivot bearing with said plate and at the same time locking the shutter to said plate. Such a shutter is shown in Figs. 65, 67 and 75.

The construction shown in Fig. 9 is preferably employed for the purpose of affording a ready and easy method of resetting the counters. In order to prevent complications arising in taking the returns from the machine after the election, it is necessary to have the counters all set at zero at the beginning of the election so that the indication of the counters at the end of the election will indicate nothing less nor more than the actual number of votes that have been cast for the candidates indicated. The yoke 54 has carried thereon two pallets 55 and 56 which alternately engage with the opposite sides of the star wheel 57 and rotate it the twentieth of a revolution at each stroke, and positively stopping the rotation of the star wheel and locking it at the end of both the forward or backward movements of the stroke.

It will be seen that the centers of the pallets are not in line with the center of the star wheel, but are placed a little above it. If they were in line they would alternately engage with only the recesses on opposite sides of the star and would not advance the counter. Consequently they are placed out of line sufficiently far to alternately engage with the cam faces of the star by which the forward movement of the star is secured.

Reversing the movement of the key as is shown in Fig. 9 results in an improved action of the pallets of the yoke on the star wheel of the counter. It will be noticed that the bottom of the pallets 55 and 56 are placed in line with the center of the shaft upon which the star wheel revolves. In consequence of this the bottom of the pallet 56 when it is in engagement with the star wheel will lie parallel with the long flat side of the tooth. If now the key is voted by being pushed in, it is obvious that the pallet moves back from the teeth of the star wheel leaving its position unchanged. If now the key is scratched by being pulled out, and the star wheel is moved forward ever so little, the point of the pallet can engage on the point of the star wheel either forming a dead center, or possibly advancing the star wheel one number, which of course is to be avoided. If, however, the other pallet is normally engaged with the star wheel and the key is voted by pulling it out the eccentric position of the pallet holds the star wheel so that it passes out at the middle of the opening between the two points of the star instead of bringing one point of the star close to the pallet. The margin of safety is thereby increased, for while in the other position the star would only have to move a hairs breadth to engage the point of the star with the point of the pallet, in this position it would have to move fully the 16th of an inch, which is practically impossible, besides a washer may be interposed between the yoke and the star. The pallet 56 now engages the star wheel only when the universal bar is acting and as it advances into the star wheel the flat surface on the star wheel comes parallel with the underside of the pallet, but as soon as the pallet has completed its stroke it immediately returns the full distance of the stroke of the key at the end of which the other pallet has engaged and moved the star wheel again so that the pallet 56 cannot engage on the point of the star wheel under any circumstances.

The star wheel carries rigidly with it a gear of twenty teeth, which together with the star wheel revolves on the shaft 58. Meshing with this gear is a similar gear of twenty teeth carried on the units wheel of the counter 59, which wheel revolves on the shaft 60. The mutilated gear carried on the shaft 58 transfers the movement of the units wheel to the tens wheel, and a similar wheel transfers the movement of the tens wheel to the hundredths wheel, such as is shown in Fig. 12 of my application. By the meshing of these gears with each other the wheels of the counter are locked in a train which is controlled by the pallets on the yoke, and by placing the yoke on its center so that the star wheel 57 can revolve free from interference with the pallets 55 and 56, the units wheel of the counter is free to revolve for the purposes of resetting. For this purpose I employ the resetting tool such as is shown in Fig. 28. This resetting tool comprises a frame 61 with a U shaped bearing piece 62 carried thereon, in which runs the shaft 63 which has at its right hand end the crank 64. Keyed to the shaft is the groove wheel 65 which is in frictional contact with the rubber wheel 66 mounted upon the shaft 67. The ends of the tool are shown forked at 68—68 to engage with the counter carrying angle in case the front plate is completely removed. But to coöperate with the construction shown in Fig. 9, in which construction the front plate is supposed to remain in the position shown, and the counter shutters 51 alone are turned down, I provide the resetting tool with a pin or pins instead of the forked ends 68. These pins engage with suitable holes 69 in the front plate 48 which holds the rubber wheel in proper relation with the units wheel of the counter, so that by turning the crank 64 the units wheel of the counter is driven frictionally and can be rotated either forward or backward in order to bring all three of the wheels to zero. It is obvious too that this resetting tool may be made to reset as many as five or even more counters at a time, in which case five rubber wheels would be driven, each of which through frictional contact with the units wheel of the five counters would reset those counters simultaneously. And I may employ means on the resetting tool, one for each counter, which will stop the counter either on 999 or 000, and prevent its further rotation when the counter has been fully reset or reset to the point desired. It is for the purpose of giving the rubber wheels easy access to the units wheel of the counter that I leave the counter wheels projecting through the front plate, for which purpose the front plate is punched out with suitable openings through which the counter wheels project. These openings also have the essential function of preventing the spreading of the counter wheels so that the counter cannot be tampered with by pushing the hundredths wheel to the left and rotating it independently of the tens wheel. Thus the front plate locks the train of counter wheels from sliding while the pallet locks it from turning through the star wheel.

In order to reset the counters in another way I provide the device shown in Figs. 12 to 18 inclusive. In this case the counter wheels are carried upon the shaft 60 the same as in Fig. 9 and the star wheel is carried on the shaft 58 but the transfer or mutilated gears instead of being carried on the shaft 58 are carried on an additional shaft 71 which shaft 71 is carried on arms 72, which arms are pivoted on the shaft 73. By throwing these arms back to the dotted line position shown in Fig. 13 the transfers are thrown out of mesh with the counter wheels leaving them to be rotated each independently with the other when they may be quickly brought into line by rotating them backward until suitable recesses 74 in the counter wheels run into the flat spring 75 which is carried rigid with the arms 72 and which is thrown up into engaging position by throwing the transfer gears back out of mesh. By this means all the counter wheels may be very rapidly and conveniently reset. The shaft 71 which carries the transfer gears is a short shaft individual with each counter as are the arms 72 and the springs 75, as may be seen from Figs. 14 and 15. In Figs. 16, 17 and 18 I have shown a different way of throwing the shaft which carries the transfer gears up in order to disengage the transfer gears from the counter wheels. In this case a U shaped strap 76 is carried to have a reciprocating movement for which purpose it has a slot at 77 so as to engage with the shaft 78 which guides it for such purpose. At its forward end on both sides it carries a cam 79 with which engages the shaft 80 which carries the transfer pinions of the counter. By pulling the strap 76 in the direction indicated by the arrow 16 the shaft 80 is lifted which carries the pinions out of mesh with the counter wheels, after which they may be rotated to their zero position, after which the transfer pinions may be returned to their engaging and locking position. So that in addition to the means which I have already described of resetting the counter wheels through frictional contact I may employ either of the above means for resetting the counters as well.

*Irregular balloting device.* In Figs. 21, 23, 26–7 and 33 I have shown my new form of apparatus for depositing an irregular ballot. As shown in Fig. 23 the bottom part of the front plate of the machine carries riveted thereto a free ballot receptacle 82. These are simply punchings of sheet metal bent to the required form and clamped in any suitable manner to the front plate. The opening which runs through them from top to bottom is capable of receiving a card on which the name of the irregular candidate is supposed to be written. When the voter wishes to vote for an irregular candidate he writes the name on the card and places it in the free ballot receptacle. The ballot is subsequently deposited when the gate is swung by means which I will now describe.

Back of the keyboard is the irregular yoke 83 which carries thereon the elliptical stud 42 by means of which it is driven through the universal bar, and it also carries the long stud 43 by means of which it is interlocked with the rest of the keys in its group. This yoke is formed of a simple punching which is bent to the required shape and at its front end carries a face plate 84. To this face plate is attached by means of screws, a piece 85 which has a short upper lip 86 and a long lower lip 87. The lower lip projects out in front of the keyboard and is turned up at its front end as shown in Fig. 33 to form a finger hold 88. When the voter has deposited his ballot in the cup 82 he takes hold of the part 88 and pulls out the slide. When this is out to voted position the lip 86 covers the upper end of the receptacle 82 which prevents the insertion of another ballot. There is nothing to prevent the voter, however, from pushing back the slide 85—88 which will unlock its single candidate group so that he may vote for any of the regular nominated candidates. But if after having arranged his irregular ballot in the manner above described he swings the gate the universal bar will push the irregular balloting slide further out so that a hole carried in the bottom part registers with the opening through the receptacle 82 when the card or irregular ballot may drop therethrough into the receiving box below which is shown in Fig. 23, after which the further movement of the universal bar resets the free balloting device to its original position. In order to give the card ample time to drop through the opening which is brought forward for this purpose, the universal bar is cut with an idle portion so that the irregular balloting device has a considerable period of rest at the moment that the card is dropped through, thus making the depositing of the ballot the more effective.

It has been found necessary to prevent fraud to the irregular balloting device of multi-candidate groups, by coupling all of the irregular balloting devices of each group together for simultaneous action, then all of the openings are plugged up but one, which compels the voting of the whole ballot through the one irregular device, the operation of which will render inactive all of the regular balloting devices. In order to make the operation of irregular devices more even and simultaneous I have provided the coupling straps 90 which are clamped on to all of the irregular balloting devices of the group in front by means of screws, and a handle 91 is provided in the middle by means of which the chances of their being moved unevenly at the ends are reduced to a minimum, and to further effect this I have provided the coupling 92 at the back which engages with the locking fingers 93 which compels them to move at the rear just as the couplings 90 compel them to move uniformly at the front end. The slide 87 is provided with the upturned sides 94—94 as are shown in Fig. 24, which guides it the more accurately and evenly as it passes the receptacle 82.

In Fig. 25 I have shown the metal box 95 into which a folded ballot may be placed, by means of which it will be carried safely through the irregular balloting device into the receptacle 96 below. In Figs. 30, 31 and 32 I have shown the details of construction of the compartments in the bottom of the machine in which the free ballots are deposited as they are voted. This is comprised essentially of a skeleton construction 97, 98 and 99 which is grooved to receive the partition pieces 100. This skeleton construction is made in sections, which correspond in size with the sections of the machine, and they are inserted by passing them up through the bottom of the machine and fastening them in place in any suitable manner. In arranging the machine for elections these sections may be taken out and any number of partitions removed so that the compartments below will correspond with the groups arranged in the interlocking system of the machine. So that it will be seen that I have provided the machine with an interchangeable free ballot receiver just the same as the machine is provided with an interchangeable interlocking system. It is obvious that where large multi-candidate groups are to be provided for on the machine, and the boxes 95 shown in Fig. 25 are used in those groups, these boxes being larger than the cards must have a corresponding large place for their reception in the bottom of the machine, consequently by removing one or more of these partitions the spaces for two or more groups may be thrown together very easily. It is here to be remarked, however, that when the boxes 95 are not used the free ballot receptacles are closed up by a plug which leaves room enough for one standard card to be inserted, and no more, so that the machine cannot be beaten by voting two or more cards, it being understood that only such cards will be recognized as ballots as are furnished by the election board.

As shown in Fig. 23 the bottom of the machine in front is provided with a door 101 pivoted at 102 which swings down to a position at right angles to the face of the machine. This affords a convenient shelf on which the irregular ballots may be pulled out and inspected after the election is over. The door itself is locked by two locks of different combination so that the key of one lock will not unlock the other, and it is provided that the key for one lock shall be carried by the judge of one party and the key of the other lock shall be carried by the judge of the other party.

In Figs. 35 and 39 I have shown an improved form of top interlocking channel in which the interlocking blocks are carried more rigidly than by the interlocking channel in the application of Angus McKenzie above referred to. In both of these cases solid bars of iron are used instead of sheet metal, and the bars of iron are grooved out to a V shape in Fig. 35, and are rounded out in Fig. 39. The channel in Fig. 35 carries the blocks which have corresponding V shaped sides. Like Fig. 39 the channel carries blocks which are rounded such as are shown in Figs. 40 and 41. In Fig. 38 I have shown a new type of upright interlocking channel in which the interlocking block instead of being carried on the edge of the upright channel is carried in a groove in the middle of it. The upright channel 105 carries the interlocking blocks in the middle groove 106 as shown in Fig. 38, which is a cross section of the upright channel shown in Fig. 37. The upright channels 105 in Fig. 37 are cut out a sufficient part of their length to receive the spear heads 107 which are pivoted to the top block of each channel. The upright channel 105 is consequently forked at the top ending with the two pieces 108 and 109, to the top of each of which one of the sides of the top interlocking channel 110 is rigidly fastened by means of screws. The blocks in this case are shown having a square tongue which engages in a corresponding groove 111 in the top channel 110. By means of this construction, the utmost rigidity is secured.

In Figs. 42 and 45 I have shown further improvements of the top interlocking channel in which case a construction equally rigid with that shown in Fig. 37, and much more simple, is obtained. In Fig. 42 the upright channels 112 support their top or angle iron 113, attached to the vertical part of which is the interlocking channel 114. In this interlocking channel is carried the interlocking blocks 115 which are T shaped in cross section, the middle rib of which projects from the channel and furnishes the surface on which the spear heads interlock with each other. A further improvement on Fig. 42 is shown in Fig. 45 in which an angle iron 116 is used to form the bottom part of the top channel, while the upper part of the top channel is formed by an angle iron 117 shaped much like a figure 5. This channel supports the interlocking blocks 118 which are simple angle irons, one side of which forms the surface which interlocks the spear heads 119. This same channel in principle is also utilized to form the upright channel as is shown in Figs. 43 and 44, in both of which cases the interlocking block is an angle iron held rigidly in position by the right angle slot in the channel, and in both of these channels the interlocking wedge travels across the face of the channel as shown in Figs. 42-3 and 45, instead of through the channel such as is shown in Figs. 35 to 39 inclusive, thus making all the parts of easy access, and facilitating removal and insertion.

In the channel shown in Fig. 43 the part 120 is shaped by a combined process of drawing and milling, after which the channel is completed by the addition of the strip 121, which is rigidly secured to the part 120 by screws or rivets. In Fig. 44 I have shown a channel which may be formed by drawing alone, the parts 122 and 123 being drawn to gage separately and afterwards clamped together by rivets or screws to form the right angle slot which holds the interlocking blocks. Either of these forms of channel may be used for the upright channel, but preferably I employ that shown in Fig. 44 because it is cheaper and easier constructed. The channel may be formed also of two of such parts 120 shown in Fig. 43, placed together so as to form a T shaped channel. In this case the part 121 is dispensed with. The channel block then would be T shaped in cross section similar to that shown in Fig. 42. It is obvious that the block of the channel may be of any desired cross section. The sides do not have to be perpendicular to each other although this form is preferred. The blocks may be T shaped, and the T instead of being square may be round at the ends, or the blocks may be shaped in cross section like an I or Z shape, in which the three parts of the angle may be perpendicular to each other or at more or less of an angle to each other.

The channel may be formed too of a square or round piece so shaped that the blocks will embrace the channel instead of the channel embracing the blocks, any of which forms I consider the full equivalent of my invention. But the latter is preferred, first, because it is more compact and because the middle of the interlocking channel can be easily braced against the tripping bar guide without interfering with the travel of the block which could not be done the other way without some trouble, and weakening the construction.

In Figs. 46 and 47 I have shown a form of screw adjusting block to provide for the adjustment of the interlocking system in the multi-candidate group. In this case the blocks 125 are made to fit the groove in the channel 116—7 shown in Fig. 45, and it is also formed with the thickened outer portion 125 sufficient to give a bearing for the screw shaft 126. The block proper is made of two parts, which parts are held in relation with each other by the screws 127 and 128. When a multi-candidate group has been formed and it is found necessary to take up some of the space in the interlocking system of the group the screw 128 is loosened to permit the rotation of the thumb screw 126 and 127. This screw has a plain shaft on the right in Fig. 47 and is threaded at the left hand end in Fig. 47, which end engages with a similar thread in that part of the block. The rotation of the screw spreads the blocks to any desired extent, after which the screw 127 may be clamped in place by the screw 128, in which position just enough room is left in the interlocking system of the group to vote the proper number of keys in the group. It has been found in practice that these blocks are ordinarily not necessary except in groups of eight or larger, and by their use the effectiveness of the interlocking system in large groups is found to be very much increased.

In Figs. 20 and 22 I have shown my provision for indorsed candidates in multi-candidate groups. Upon the interlocking channel 121 I fasten the auxiliary channel 129 by the clamps or braces 130 at both the top and bottom of the auxiliary channel. 131 refers to the interlocking wedge of the regular part of the interlocking system, while 132 refers to the interlocking wedges of the particular candidate which has been nominated by one party and indorsed by another. Just enough room is left between the blocks of the indorsement channel to permit the voting of one wedge and no more, and on account of the construction of the interlocking blocks it is not necessary to make the top block 133 adjustable to provide for more than two wedges.

As will be seen in Fig. 19 the top of the interlocking blocks is made substantially plain while the bottom of the block is provided with the projecting finger which reaches past the interlocking finger, and comes just in contact with the block below it whether the interlocking finger is between the blocks or removed from between them. This refers, of course, to the unvoted position of the finger only because when the key has been voted and the thick part of the finger has been pulled between the interlocking blocks the interlocking blocks no longer touch each other. On account of this projecting finger the interlocking wedge is always embraced by the interlocking blocks so that it cannot get out of position any more than if it passed through the channel instead of along side of it. The blocks are made to rise and fall freely so that as the wedge is raised or lowered the projection on the bottom of the block just above it always holds it against the channel. In Fig. 22 I have shown a cross section of the interlocking system shown in Fig. 20. It will be noted that both the main interlocking wedge and the indorsed candidate wedge are pivoted to the stud 43 which is made sufficiently long in every case to hold the two wedges. The interlocking channels 121 and 129 are substantially the same in Fig. 22 although the indorsed candidate channel is just one of the main interlocking channels reversed end to end, making them show right and left in cross section. The interlocking blocks are made from the same angle iron but as the projecting part which embraces the interlocking finger must always come at the bottom of the blocks in both cases, it is apparent that the interlocking blocks of the indorsement channel are not interchangeable with the interlocking blocks of the regular channel.

In Fig. 59 I have shown a detachable spear head 134 which has a hole 135 at the bottom thereof through it. A piece 136 is pivoted to the top block of the channel 137. This piece 136 is bent to form a groove in which the piece 134 slides and is slotted at 138, to admit of the screw 139 passing therethrough. The piece 134 may be moved to any position along the slot 138 and clamped in such a position by the screw 139. I have found this very desirable for the speedy assembling of the machine.

*Yes and No interlocking.* In Figs. 48, 49, 50 and 57—8 I have shown my improvements in the Yes and No interlocking system. As shown in Fig. 49 the Yes and No interlocking system is built upon a plate 141. At regular intervals upon this plate are pivoted the interlocking levers 142. These levers are pivoted on a sliding pivot 143 which pivot has a square shank which extends through a rectangular slot in the plate and is riveted into a square piece of metal at the back. The pivot has a sliding engagement with the plate which supports it, but it is prevented from turning in the plate by reason of its square shank engaging with the rectangular hole. The interlocking lever, however, is permitted to turn upon the pivot to any extent. As shown in Fig. 48 the pivot 143 terminates with the half round end, the flat portion of which is upper most. The wedges 144 are pivoted to the Yes and No voting keys and engage in the slots 145 in the plate 141. Normally the interlocking lever 142 rests upon both of these wedges and its pivot in this position is at the bottom of the slot in the plate 141. When one of the keys is voted the movement of the wedge raises the lever of that set which moves the pivot 143 to the top of its slot in the plate 141, preventing the movement of the other key, and by means of this the keys are interlocked against each other. The plate 141 may be of any length. Ordinarily I make it high enough to accommodate seven pairs of Yes and No keys, the Yes keys of which are all on one side of the plate and the No keys on the other.

It is frequently necessary to lock out part or all of the Yes and No keys against certain classes of voters, and this is done by means which I am now about to describe. Traveling across the face of the interlocking levers 142 are the slides 146 and 147. These slides in most respects are substantially alike. They are placed in the same plane with the line of their abutting edges passing through the center of the pivot 143. At regular intervals they are provided with the rectangular recesses 148 by means of which they encompass the pivots of the interlocking levers, and are permitted to have independent movement without interfering with the position of the interlocking levers. If either of these slides are moved far enough it is obvious that they can pull the pivots of the interlocking levers down to the lower limit of their travel, thus locking the levers from being raised, which in turn will lock both the Yes and No key of that lever against operation. It is necessary, however, to provide selective means in connection with the slides, and for this purpose each slide is provided with a threaded hole 149 and a slot 150 in connection with each interlocking lever. Small rectangular slides 151 are provided which are made with the slot 152 and pin 153. A thumb screw 154 is also provided. The thumb screw engages with the threaded hole in the slide 146 or 147 and passes through the slot 152 in the slide 151. The pin 153 on the slide 151 engages with the slot 150 provided in the slides 146 and 147, and by means of the thumb screw 154 it is apparent that the pieces 151 have a short adjustment up and down the slides 146 and 147. It is to be here noted that the pieces 151 are substantially alike on both the slides 146 and 147. The slides 146 and 147 are limited to a movement which of itself does not lock down the interlocking levers, but if the pieces 151 are clamped to the slides in their lowest position when the slides 146 and 147 are raised, then when the slides 146 and 147 are pulled down they will lock in its lowest position the pivot 143 with which they come in contact. Thus a predetermined number of pairs of keys may be locked out in advance by the adjusting pieces 151 on the slides 146 and 147.

As shown in Fig. 49 the slide 146 has at its bottom a horizontal slot 155 with which engages a pin 156 carried on a crank 157, which crank is keyed to the shaft 158, which shaft is supported in the bearings 159, and on its outer end carries the crank 160, the shaft itself terminating in the square end 161. The connecting rod 162 connects the crank 160 to the woman's lockout slide 163. In the slide the connecting rod 162 carries a pin 164 on its end by means of which the engagement with the woman's lockout slide 163 is effected. This pin 164 extends through the woman's lockout slide and engages with the slot 165 in the piece 166, which is rigid with the frame or casing of the machine. The length of the slot 165 limits the travel of the woman's lockout slot and also the distance through which the slide 147 is raised and lowered. The slide 147 carries integral therewith at its bottom a piece 167 bent at right angles thereto in which is carried a pin 168 with which a cam slide 169 engages, which cam slide is pushed in or out by means of the handle 170, the cam being so cut that pushing the handle 170 in will pull down the slide 147 and lock out those pairs of Yes and No keys for which it has been previously set.

In the ordinary operation of the machine the slide 146 is coupled with the woman's lockout and is intended to lock out all the Yes and No keys against the women voters, while the slide 147 is intended to lock out those Yes and No keys only which non-taxpayers are not entitled to vote, it being understood that this adjustment is made separately for each election, and is made according to the ballots appearing upon the face of the machine. But it is obvious that any adjustment required for the election may be made within the limits of the mechanism shown. The slides 146 and 147 are carried upon the plate 141 by means of rivets 171 which rivets are placed at both ends of the slides and also in the middle. These rivets carry a collar which rests against the front of the plate, which collar is a little thicker than the thickness of the interlocking levers. By means of the collar the slides are held out of frictional contact with the interlocking levers. The rivet terminates in a T shoulder which is a little smaller than the slot 172 so that the slide is easily passed over the T shoulder after which by giving the rivet a quarter turn to the position shown in Fig. 49, it is apparent that the slides are securely locked in position. The rivets are riveted to the plate 141 but are free to rotate thereon, thus providing an effective way of supporting the slides in proper relation with the plate and interlocking levers. The slots 172 at the same time regulate the length of travel of the slides.

In Figs. 57 and 58 I have shown some modifications of this interlocking system. The slide 146 carries the cam slot 173 at its bottom. Instead of the crank shaft used in Figs. 49 and 50 I have provided a connecting slide 174 which ends in a pin 175, which engages with the slot 173. The connecting slide 174 is cut out of a single piece of metal, the part 176 being bent at right angles carries the slot 177 with which a screw 178 engages, and by means of which the travel of the slide 174 is limited. The pin 175 is formed integral with the end 176 and engages with the cam slot 173, when the part 176 is held in its proper position by means of the screw 178. The part 174 is recessed at 179 to provide for the engagement of the lever 180 which is pivoted at 181, by means of which the lockout is thrown on or off. The lever 180 carries the screw 182 at its inner end by means of which it is held from being pulled out from the machine. After the election is over the pivoted pin 181 is raised after which the lever 180 may be pushed into the machine, in the doing of which it strikes against a cam surface 183, by means of which its inner end is moved to the left, which moves the woman's lockout and the Yes and No lockout to locking position, thus securely locking all the parts of the machine which are locked by these lockouts. The outer end of the lever passes through the slot 184 with which it always remains in engagement. This slot 184 limits the movement of the lever to the right and left as it is operated by the judge in throwing the lockout on or off, and also permits the lever to perform the function of locking the machine when it is shoved in out of the road after election.

In Figs. 69 and 70 I have shown another form of full stroke device. In this case the sector 190 is left smooth. A pawl 191 is provided which may be also either left smooth or provided with a knife edge 192. I have found the bite between such a pawl and smooth surface to be sufficient to answer all the purposes of the pawl and ratchet, and to be very much more easily made. The lower arm of the gate in this case is made with the opening 193 therein through which passes the hasp 194. The gate passes over the hasp every time it is swung to resetting position, and after the election is over it may be locked in that position by locking the padlock 195 through the hole 196 in said hasp.

In Fig. 71 I have shown a simple means of attaching the straight ticket key to the straight ticket rock shaft. The rock shaft 197 has riveted to one end thereof the arm 198, which arm is preferably a punching with two lugs or rivets at its lower end punched at intervals therewith, which passes through corresponding openings in the rock shaft 197, after which they are firmly riveted to the rock shaft. A simple staple 199 passes through suitable holes in the shank of the key 201 which staple is fastened in on one side by the cotter pin 200. If desirable I may have two arms 198 riveted to the rock shaft which will embrace the shank 201 of the straight ticket keys between them making a correspondingly stronger connection. It will be seen that by pulling out the cotter pin 200 and by pulling out the staple 199, the straight ticket keys may be moved from the machine without disturbing the straight ticket rock shaft.

In Fig. 73 I have shown a detail by means of which the counter is kept continually locked. It will be noticed that when the key is on its center the star wheel is midway between the pallets and can be rotated without interference from them. It is in this way that the counter is unlocked for resetting. In order to overcome this, if it is considered objectionable, I provide the finger 202 pivoted to the counter angle at 203. This finger has a projection 204 which also rests upon the top of the yoke. It has upon its upper side a projection bent at right angles at 205. The key has the recess 206 cut in its upper side. When the key moves to its voted position the recess 206 permits the projection 204 to drop, by means of which the projection 205 engages with the teeth on the units wheel of the counter locking them against rotation. As the key continues its movement driven by the universal bar the cam at the rear end of the recess 206 lifts the arm 202 so that the counter is free to rotate the twentieth of a revolution. As the key comes on its return stroke the counter is again unlocked by the arm 202 as it is unlocked by the pallet, and just before the second pallet begins to move the star wheel, the arm 202 is again raised to free the counter from rotation, thus it will be seen I have provided means by which the counter is kept continually locked either by the pallets which drive the star wheel or by the tooth 205 which engages with the teeth of the gear wheel of the units counter.

In Figs. 51—2 and 74—5 I have shown new forms of public counters. The counter shown in Figs. 51 and 52 is carried on the top of the door 207 of the machine shown in Fig. 33. The finger 208 is carried on the channel iron 39 and reciprocates with it. It has a sliding engagement with the yoke 209 which may be of any suitable pattern to communicate motion to the counter. The reciprocating movement of the channel iron 39 is thereby communicated to the yoke by means of which the counter is advanced one number for each complete operation of the machine. The counter is placed upon the door 207 and when the door is raised the counter is detached from its driving mechanism, so that the operation of the machine does not affect the counter.

In Figs. 74 and 75 I have shown the counter rigidly mounted in the machine proper and not on the door. The finger 208 has a sliding engagement with the cam bar 210 which is held to vertical reciprocation by the screws 211 and the guide slots 212. It has cut therein a cam slot 213 which engages with the pin 214 carried on the yoke 215. The reciprocation of the cam plate 210 causes the reciprocation of the yoke 215 transversely thereto, by means of which the counter 216 is operated.

In Figs. 53 and 54 I have shown an additional safe guard to the machine. On preferably either the Yes or No cam bar I mount a diamond shaped stud 220. Mounted on the bottom plate of the machine is the standard 221 which affords a bearing for the rocking angle 222, to the top of which angle is fastened a link, which link terminates on its inner end with a pin 224, which pin engages with the diamond shaped stud 220. The diamond shaped stud is not mounted directly upon the cam bar but upon the plate 225, which plate in turn is fastened by screws or rivets to the cam bar so that the link 223 and pin 224 is held between the cam bar and the plate 225. It is understood that two or more of these rocking angles 222 are mounted, one in the vicinity of the trip shaft which carries the diamond stud, and the other at a suitable distance, the two of which are connected together by means of a shaft 226 by means of which they are compelled to move in unison. It will be noticed that the shaft 226 moves concentric to the center about which the right angle piece 222 rotates. In the reciprocation of the cam bar the pin 224 is engaged by the diamond stud 220, and as the stud moves up the pin is pulled in. The link 223 is held to a longitudinal reciprocation by means of the guide 227 which is fastened to the guide angle of the tripping bar, and does not partake of its motion. As the link 223 is thus pulled in it rotates the right angle piece 222 about its center and raises the bar 226. This bar which passes under a part or all of the irregular interlocking fingers on the machine raises them, which in turn raises the spear heads and justifies them. This is especially desirable in large multi groups. It is evident that as many as seven keys can be voted in one column. If this is done especially at either end of the group and the machine is reset it will be very difficult to vote a straight ticket because in raising the spear heads all the blocks of the top channel of that group will have to be moved to the right or left. The leverage of the straight ticket key is too small to accomplish this easily, while the leverage of the gate acting through the parts described is sufficient to accomplish this with ease, thus leaving as little work as possible to be done by the straight ticket key. It is obviously that substantially this same result can be secured by moving the woman's lockout slide after the machine has been locked by the gate or holding it in locking position until the gate has been swung to the voting position. This can be done by the judge from the back of the machine or the machine can do it automatically through the woman's lockout and still leave the woman's lockout free to perform its function with reference to partially qualified voters. Another function of these devices is that they lock out all of that part of the machine, so that the keys are locked against operation. The parts are so adjusted that this takes place as the gate is being swung in by the voter preparatory to voting, and prevents premature unlocking of the straight ticket keys and the individual keys. The reciprocation of the universal bar pulls the link 233 in sufficiently far to accomplish this purpose, and after the pin 224 passes the lower point of the diamond stud 220, a spring pulls the right angle piece 222 with the shaft 226 back to the normal position, thus unlocking the machine so far as this device is concerned. But the pin 224 does not pass the locking point on the diamond stud until after the points 228 have passed the stud carried on their respective voting devices, thus the voting mechanisms of the machine during the inward swing of the gate are locked first by this operating device until they are again locked by the tripping bars. When the gate has been fully swung in the tripping bars have reached the position shown in Figs. 8 and 9 and 33, when the vote may take place.

In Fig. 77 I have shown another form of my improved automatic lockout by which the keys are all held locked against movement until the gate has swung a certain portion of its distance forward. The universal bar 40 carries a diamond shaped stud 220 such as is shown in Fig. 53. A link 250 carries a roller similar to roller 224 which engages with the stud 220. At its outer end this link engages with the rock shaft 251 similar to that shown at 220, Fig. 53, but this rock shaft is preferably placed outside of the sliding lockout and consists preferably of a single piece of angle iron. An upward movement of the diamond stud 220 pulls the link 250 forward and causes the angle iron 251 to rock, which raises its upper edge raising all of the movable parts of the interlocking system sufficient to take up the lost space and this effectually prevents their operation. When the stud has passed completely up and beyond the pin 224, the weight of the interlocking system resting on the angle iron 251 causes it to drop which pulls the roller 224 outside of the edge of the diamond stud which when it comes down again pushes the link 250 out. The link has an independent movement independent to the bar 251 which is measured by the length of the slot 252. The cam plate 253 is cut at its upper portion so that a cam engages the roller 224 and moves the link 250 in when the universal bar descends again, it being understood that when the bar 251 is down the slot 252 permits the link 250 to move forward or back carrying the pin 224 forward or back of the edge of the diamond stud 220. But the weight of the interlocking system resting on the angle 251 will always draw the pin 224 back from the bottom of the edge of the diamond stud when the diamond has passed up and beyond it, but the bottom edge of the diamond stud 221 in no case will pass beyond the roller 224 and release it until the points 254 on the universal bars have passed the studs 42 on the keys. On the extreme right end of the rocking angle iron 251 is carried a long curved finger 255 which engages with the opening 256 of the bar 147 of the Yes and No lockout, holding it down in position so that all the Yes and No keys are held locked against operation as will be fully understood by reference to Figs. 48 and 49 and the descriptions noted therewith.

In Fig. 78 I have shown a straight ticket key equipped so as to limit the pull that can be exerted on its straight ticket rock shaft. It will be understood that the voter can pull any straight ticket key on the machine and push back one individual candidate key and pull out another in its stead then by pulling on the straight ticket key again he can throw his whole force upon a single key that is in unvoted position and held against voting by the interlocking system. This throws a heavy strain upon the interlocking system and in order to prevent any unnecessary strain from being exerted on it through the leverage of the straight ticket key I make connection between the straight ticket key and its rock shaft through a spring. The straight ticket rock shaft has thereon a lug 198, see Fig. 71, which engages with the block 260. This block slides in a slot in the straight ticket key and carries thereon a pin 261. A similar pin 262 is mounted on the straight ticket key and the spring connects these two, which spring is under an initial tension and unless the force applied to the key exceeds the initial tension, the spring will not yield, and this initial tension is such as to enable the force applied to the straight ticket key to move the rock shaft and move a straight ticket without increasing the length of the spring, but if any obstruction is offered to the voting of a straight ticket by the interlocking system then the spring will yield and the lug 263 on the straight ticket key will come against the angle iron or brace 264 which is a part of the frame of the machine, which will prevent its further movement, this being the normal travel of the straight ticket key when voting a straight ticket, but the rock shaft will not have moved with its key. The strain communicated to the rock shaft will be equal to the strain of the spring only when stretched to this length, and this will not be sufficient to in any way injure the interlocking system.

In Fig. 79 I have shown a lock for the rocking cams of the machine. When the gate has been placed in position to lock the machine against further voting, the universal bars are all down as far as they will go, which pulls the keys back to original position and holds them locked against movement. The bar 33 shown in Fig. 8 moved over to the right is then in the position shown in Fig. 79 moved over to the left. If held in this position directly it will be impossible to raise the universal bars to release the keys. For this purpose I have provided a pivot latch 265 the end of which is thrown in directly behind the bar 33 holding it in its left hand position. This latch is pulled out by means of a handle 266 which is in the end of the spring and has recesses in it to engage the stop 267 by means of which it is held positively in its inner or outer position, in the former of which positions it locks the machine against voting, and in the latter position it permits the operation of the machine.

The machine covered by this application is an improvement upon the machine set forth in various pending applications of Angus McKenzie.

1. The combination in a voting machine of a casing a guide carried thereby, of a curtain suspended therefrom in front of the keyboard, a gate on the end of the machine, means operated by the gate when moved in one direction for moving the curtain to conceal the keyboard, said means being operated by the gate when moved in the other direction to move the curtain to expose the keyboard, substantially as described.

2. The combination in a voting machine having a vertical keyboard, with a barrier suspended in front of said keyboard, and a gate carried on the end of the machine by means of which said barrier may be moved to either expose or conceal the keyboard.

3. The combination in a voting machine, of a casing having a stationary frame extending across the front thereof, a keyboard, a curtain loosely mounted on said frame for alternately exposing and concealing said keyboard, and means for operating said curtain carried on the end of the machine.

4. The combination in a voting machine of a vertical keyboard, a guide carried above said keyboard, a curtain suspended from said guide capable of alternately exposing and concealing the keyboard, means carried on the end of the machine for operating said curtain to alternately expose and conceal the keyboard.

5. The combination in a voting machine of a guide carried on the top of the machine, a divided curtain suspended from said guide, arms for opening and closing said curtain, said arms being pivoted on the top of the machine, and a link connected to said arms, said link being moved by the gate, the movement of said connecting rod causing said arms to simultaneously move in directions opposite to each other.

6. The combination in a voting machine of a mechanical movement for operating the curtain thereof, comprising a lever of the first class and a lever of the third class, a link for operating both simultaneously whereby said levers are caused to move simultaneously in opposite directions toward or away from each other.

7. The combination in a voting machine of a guide carried from the top of the machine, a curtain suspended from said guide in front of the keyboard of said machine, a pair of arms alternately exposing and concealing said keyboard, a link for simultaneously operating both of said arms, and a connecting rod for transmitting motion from the gate to said link, together with means for transmitting only a part of the connecting rod to said link, substantially as described.

8. The combination in a voting machine of a curtain suspended in front of the keyboard of the machine, arms for operating said curtain, and a link for simultaneously moving said arms, a connecting rod and a gate for moving said link, said arms, said curtain and said parts being so adjusted that the curtain will not be moved to expose the keyboard until the indicators thereon have been reset.

9. The combination in a voting machine, of a locking device therefor consisting of a gate having a recessed arm thereon, a hasp carried on the body of the machine, said hasp being adapted to pass through the recess in the arm of the gate, and a locking device passing through said hasp to prevent the movement of the gate, substantially as described.

10. The combination in a voting machine of a series of voting keys and counters therefor, said keys being movable directly out from the keyboard of the machine to voted position, interlocking devices operated by said keys, means operated by the voter after voting for operating the counters of the selected keys, and positively resetting and locking the keys.

11. The combination in a voting machine of a series of registers, a series of ballot indicators forming part of the permanent structure, one for each register, freely movable into and out of coöperative relation with their corresponding register, said position being reached by pulling the key out, interlocking devices for preventing the operation of more than a predetermined number of indicators, and means for causing the simultaneous operation of all the registers whose indicators are in operative position.

12. The combination in a voting machine of a series of registers, of a series of ballot indicators therefor forming a part of the permanent structure of the machine, said indicators moving in a line perpendicular to the keyboard of said machine, one of said indicators for each register, and freely movable into and out of coöperative relation with its corresponding register, said indicator being moved to voted position by being pulled out from the keyboard, interlocking devices for preventing the operation of more than a predetermined number of indicators, and means for causing the simultaneous operation of all the counters whose indicators have been placed in voted position.

13. The combination in a voting machine, of a key, a cam bar for operating said key, a guide angle for said key and cam bar, said key being located between the cam bar and the guide angle, and said guide angle being provided with guide slots, said key being provided with studs extending through said guide slots, and interlocking fingers carried on the outer end of each of said studs.

14. The combination of a voting machine of a face plate, irregular ballot receptacles carried thereon open at both ends, a gate a slide containing a slot therein, which slide closes the bottom of said receptacle, and connections between the gate and said slide for moving the slide when placed in voted position, thereby causing the slot therein to register with said receptacle, permitting of the passing of the ballot therethrough.

15. The combination in a voting machine, of a face plate, a stationary free ballot receptacle thereon having an opening therethrough, a slide therefor having an opening in its bottom and a plate on top movable by the voter, said slide closing the top of said receptacle when moved out by the voter and bringing the opening in the bottom of the slide into register with the opening in the receptacle, to deliver the ballot therethrough.

16. The combination in a voting machine of a face plate, a stationary free ballot receptacle thereon, a slide therefor normally closing the bottom thereof, a carrier for said slide, a stud mounted thereon, a cam bar for driving said slide by means of said stud when the stud has been placed in engagement therewith, said slide being thereby driven to open the bottom of said receptacle to permit the passage of a ballot, substantially as described.

17. The combination in a voting machine, of a face plate, a stationary free ballot receptacle thereon open at both ends, and means normally closing the bottom of said receptacle and operable by the voter for successively closing the top of said receptacle and opening the bottom thereof.

18. The combination in a voting machine, of a face plate, a free ballot receptacle thereon consisting of a tube open at both ends, and sliding means operable by the voter on said machine, which means when moved by the voter successively closes the top of said receptacle and opens the bottom thereof, substantially as described.

19. The combination in a voting machine of a face plate, a free ballot receptacle thereon, a slide therefor normally closing the bottom thereof, said slide being movable to indicate a vote, means preventing the movement of said slide further than to indicate a vote, said means operated subsequently to permit the depositing of the ballot indicated, substantially as described.

20. The combination in a voting machine, of a face plate, a free ballot receptacle thereon open at both ends, a U-shaped slide which when moved successively closes the top and opens the bottom of said receptacle, voting keys, and interlocking mechanism between said slide and said keys.

21. The combination in a voting machine of a face plate, a series of free ballot receptacles thereon, a series of U shaped slides coöperating with said receptacle to regulate the casting of the ballot, an upturned lip at the bottom of each of said slides, a coupling therefor whereby a plurality of said slides may be joined together for simultaneous operation, and a handle in the middle of said coupling, substantially as described.

22. The combination in a voting machine, of a face plate, a series of free ballot receptacles thereon open at both ends, a slide for each receptacle, which slide when moved successively closes the top of said receptacle and opens the bottom thereof, an operating handle, and means for coupling a plurality of said slides together for simultaneous operation by said handle.

23. The combination in a voting machine of a face plate, a series of free ballot receptacles thereon, said receptacles being formed of a single piece of sheet metal bent to proper shape with lips thereon by which they may be clamped to the face plate, substantially as described.

24. The combination in a voting machine, of a face plate, free ballot devices attached to said face plate, a casing provided with a movable door, means for locking said door, and removable partitions adapted to be placed within said casing when said door is opened, forming compartments for the reception of the free ballots voted.

25. The combination in a voting machine, of a face plate, a casing beneath said face plate provided with grooves and with a movable door, means for locking said door, free ballot devices attached to said face plate, and movable partitions adapted to be placed in the different grooves in said casing, whereby compartments of different sizes for group or single candidate voting may be provided as desired.

26. The combination in a voting machine of a series of boxes in the bottom thereof wherein the irregular ballots are collected, a door in the casing of the machine closing the front of said boxes, whereby said ballots are concealed during the election, and whereon said ballots may be counted after the election, substantially as described.

27. In a voting machine, the combination of keys, counters, interlocking blocks and wedges, and an interlocking channel for said blocks, said channel having a slot which is L shaped in cross-section.

28. In a voting machine, the combination of keys, counters, interlocking blocks and wedges, and an interlocking channel for said blocks having a slot therein which is L-shaped in cross section.

29. In a voting machine, the combination of keys, counters, interlocking blocks and wedges, and an interlocking channel for said blocks, said channel being L-shaped in cross section and open from one end to the other, whereby the interlocking blocks and wedges are free to slide from one end of said channel to the other.

30. In a voting machine, the combination of keys, counters, interlocking blocks and wedges, and an interlocking channel for said blocks, said interlocking channel being L-shaped in cross section, and said blocks being completely surrounded by said channel with the exception of a projecting edge.

31. In a voting machine, the combination of keys, counters, interlocking blocks and wedges, and an interlocking channel for said blocks L-shaped in cross section, said blocks and wedges interlocking on one side of said channel only.

32. In a voting machine, the combination of keys, counters, interlocking blocks and wedges, with an interlocking channel for said blocks, each of said blocks being embraced on five sides by said interlocking channel.

33. In a voting machine, the combination of keys, counters, interlocking blocks and wedges, of an interlocking channel embracing said blocks, each of said blocks having five sides, three of said sides being embraced by said channel, and a part of the other two sides being embraced by said channel.

34. In a voting machine, the combination of keys, counters, interlocking blocks and wedges, and an interlocking channel for said blocks, said blocks projecting out through one side of said channel, and said blocks and wedges interlocking outside of said channel.

35. In a voting machine, the combination of keys, counters, interlocking blocks and wedges, each interlocking block being composed of two ridges, one located at an angle to the other, and an interlocking channel for said blocks, one of the ridges on said interlocking block engaging with the interlocking channel, and the other of said ridges engaging with the interlocking wedges.

36. In a voting machine, the combination of keys, counters, and an interlocking system therefor, comprising a channel, blocks movable in said channel, one or more of said blocks being composed of two parts adjustable towards and away from each other and held by means of a connecting screw, and wedge-like portions actuated by said keys and adapted to engage said blocks.

37. In a voting machine, the combination of keys, counters, and an interlocking system therefor, including a channel, blocks movable therein, one or more of said blocks being composed of two parts adjustable towards and away from each other, a screw therefor having a threaded engagement with one of said parts, a collar thereon bearing against the other part, said block being provided with a bearing for engagement with the shaft of said screw, and spear heads actuated by said keys and engaging said blocks.

38. In a voting machine, the combination of a series of voting keys arranged in pairs, one of each pair representing an affirmative vote, and one a negative vote, counters for each of said keys, and an interlocking system for said keys, said system comprising a plate with interlocking notches therein, wedges engaging the said notches, and a lever pivoted to said plate between said wedges.

39. In a voting machine, the combination of a series of voting keys arranged in pairs, one of each pair representing an affirmative vote and the other a negative vote, and an interlocking system therefor, comprising a plate with interlocking notches at the edge thereof, interlocking wedges engaging the said notches, and an interlocking lever interlocking a pair of said wedges mounted upon said plate and having a sliding engagement therewith.

40. The combination in a voting machine, of the keys a straight ticket voting device including a key therefor, a yielding connection between the key and the rest of the device whereby the force applied to move the keys by the straight ticket device is limited.

41. The combination in a voting machine of a voting device, including a key, a yielding connection between said key and its device whereby the force applied through said key to said device is limited.

42. The combination in a voting machine of counters, a face plate therefor having an opening through which said counters are accessible a shutter pivoted to said face plate, closing said opening, said shutter bearing a label holder.

43. The combination in a voting machine of a plurality of counters arranged in rows, shutters concealing said counters each row of counters lying between two shutters, said shutters bearing labels for said counters, said shutters being so arranged that the proper label only can be displayed in connection with the counters when the counters are exposed to view.

44. The combination in a voting machine of a face plate, a series of shutters pivoted thereto, a locking bar which closes said shutters against said face plate, and means for locking said bar against movement, thereby holding the shutters closed.

45. In a voting machine, the combination of voting keys arranged in single candidate groups, interlocking mechanism therefor, an irregular voting device for each group, and means for combining a plurality of said single candidate groups including the voting keys, irregular voting devices and interlocking mechanism, into a multi-candidate group, said means including devices for rendering ineffective all but one of the irregular voting devices in said group.

46. The combination in a voting machine of a series of registers, a series of ballot indicators therefor forming a part of the permanent structure of the machine, all of said indicators being exposed at all times and said indicators moving in a line perpendicular to the keyboard of said machine, one of said indicators being provided for each register, and freely movable into and out of coöperative relation with its corresponding register, said indicator being moved to voted position by being pulled out from the keyboard, interlocking devices for preventing the operation of more than a predetermined number of indicators, and means for causing the simultaneous operation of all the counters whose indicators have been placed in voted position.

47. The combination, in a voting machine, with the gate thereof, of voting keys, cam bars for resetting and locking said keys, said cam bars being operated in one direction by the gate to reset and lock the keys, said cam bars when operated in the reverse direction serving to unlock said keys for voting operation, and auxiliary means for holding said keys locked for a predetermined interval after having been unlocked by said cam bars.

In testimony whereof, I affix my signature, in presence of two witnesses.

RODERICK McKENZIE.

Witnesses:
 DANL. B. PLATT,
 A. CORCILINS.